(12) United States Patent
Roblek et al.

(10) Patent No.: US 10,809,968 B2
(45) Date of Patent: Oct. 20, 2020

(54) DETERMINING THAT AUDIO INCLUDES MUSIC AND THEN IDENTIFYING THE MUSIC AS A PARTICULAR SONG

(71) Applicant: Google LLC, Mountain View, CA (US)

(72) Inventors: Dominik Roblek, Meilen (CH); Blaise Hilary Aguera-Arcas, Seattle, WA (US); Thomas W. Hume, San Francisco, CA (US); Marvin Karl Ritter, Zürich (CH); Brandon Charles Barbello, Mountain View, CA (US); Kevin I. Kilgour, Schweiz (CH); Mihajlo Velimirovic, Zurich (CH); Christopher Thornton, Mountain View, CA (US); Gabriel Oak Taubman, Brooklyn, NY (US); James David Lyon, Zurich (CH); Jan Heinrich Althaus, Zurich (CH); Katsiaryna Naliuka, Rüschlikon (CH); Julian James Odell, Kirkland, WA (US); Matthew Sharifi, Kilchberg (CH); Beat Gfeller, Dubendorf (CH)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/148,338

(22) Filed: Oct. 1, 2018

(65) Prior Publication Data

US 2019/0102458 A1 Apr. 4, 2019

Related U.S. Application Data

(60) Provisional application No. 62/567,755, filed on Oct. 3, 2017.

(51) Int. Cl.
*G06F 17/00* (2019.01)
*G06F 3/16* (2006.01)
(Continued)

(52) U.S. Cl.
CPC ............ *G06F 3/165* (2013.01); *G06F 16/635* (2019.01); *G06F 16/683* (2019.01); *G06N 3/08* (2013.01);
(Continued)

(58) Field of Classification Search
CPC ...... G06F 3/165; G06F 16/683; G06F 16/635; G06N 3/08; G06N 20/00; G10H 2210/031; G10H 2210/046
See application file for complete search history.

(56) References Cited

U.S. PATENT DOCUMENTS

| 7,558,729 B1 | 7/2009 | Banyassine et al. |
| 8,126,706 B2 | 2/2012 | Ebenezer |

(Continued)

OTHER PUBLICATIONS

PCT International Search Report and Written Opinion issued in International Application No. PCT/US2018/053766, dated Mar. 4, 2019, 22 pages.

(Continued)

*Primary Examiner* — Joseph Saunders, Jr.
(74) *Attorney, Agent, or Firm* — Colby Nipper PLLC

(57) ABSTRACT

In general, the subject matter described in this disclosure can be embodied in methods, systems, and program products. A computing device stores reference song characterization data and receives digital audio data. The computing device determines whether the digital audio data represents music and then performs a different process to recognize that the digital audio data represents a particular reference song. The computing device then outputs an indication of the particular reference song.

34 Claims, 12 Drawing Sheets

(51) Int. Cl.
*G06F 16/635* (2019.01)
*G06F 16/683* (2019.01)
*G06N 3/08* (2006.01)
*G06N 20/00* (2019.01)

(52) U.S. Cl.
CPC ....... *G06N 20/00* (2019.01); *G10H 2210/031* (2013.01); *G10H 2210/046* (2013.01)

(56) References Cited

U.S. PATENT DOCUMENTS

| | | | |
|---|---|---|---|
| 8,140,329 B2 | 3/2012 | Zhang et al. | |
| 8,321,217 B2 | 11/2012 | Sehlstadt | |
| 8,805,683 B1 | 8/2014 | Wiseman et al. | |
| 9,224,385 B1 | 12/2015 | Sharifi et al. | |
| 9,280,599 B1 | 3/2016 | Wiseman et al. | |
| 9,367,887 B1 | 6/2016 | Sharifi | |
| 10,761,802 | 9/2020 | Roblek et al. | |
| 2004/0231498 A1 | 11/2004 | Li et al. | |
| 2006/0015327 A1 | 1/2006 | Gao | |
| 2008/0201140 A1* | 8/2008 | Wells | G10L 15/26 704/231 |
| 2010/0093393 A1 | 4/2010 | Greaf | |
| 2010/0170382 A1 | 7/2010 | Kobayashi | |
| 2011/0173208 A1 | 7/2011 | Vogel | |
| 2013/0259211 A1* | 10/2013 | Vlack | G10L 25/54 379/88.01 |
| 2013/0318114 A1* | 11/2013 | Emerson, III | G10L 19/018 707/758 |
| 2014/0337021 A1 | 11/2014 | Kim et al. | |
| 2015/0186509 A1 | 7/2015 | Kelly | |
| 2015/0193199 A1* | 7/2015 | Kim | G06F 3/165 700/94 |
| 2015/0332667 A1 | 11/2015 | Mason et al. | |
| 2016/0322066 A1 | 11/2016 | Sharifi et al. | |
| 2017/0068513 A1* | 3/2017 | Stasior | G06F 3/167 |
| 2017/0178681 A1 | 6/2017 | Keal et al. | |
| 2017/0193362 A1 | 7/2017 | Cremer et al. | |
| 2019/0102144 A1 | 4/2019 | Roblek et al. | |

OTHER PUBLICATIONS

Qin et al. "Query Adaptive Similarity for Large Scale Object Retrieval," IEEE Conference on Computer Vision and Pattern Recognition, Jun. 2013, 8 pages.
PCT Invitation to Pay Additional Fees and, Where Applicable, Protest Fee, issued in International Application No. PCT/US2018/053766, dated Jan. 7, 2019, 16 pages.
"Non-Final Office Action", U.S. Appl. No. 16/148,401, dated Nov. 29, 2019, 25 pages.
"Notice of Allowance", U.S. Appl. No. 16/148,401, dated Mar. 27, 2020, 7 pages.
Pursuant to MPEP § 2001.6(b) the applicant brings the following co-pending application to the Examiner's attention: 16/148,401.
"International Preliminary Report on Patentability", PCT Application No. PCT/US2018/053766, dated Apr. 16, 2020, 14 pages.
"Notice of Allowance", U.S. Appl. No. 16/148,401, dated Jun. 24, 2020, 5 Pages.

* cited by examiner

FIG. 3A

308
Determine whether digital audio data represents music (cont.)

Maintain values that indicate whether digital audio data represents music, in buffer of music estimation decisions
320

Determine whether prior music estimation decisions meet pre-determined criteria for outputting indication that digital audio includes music
322

Output indication that digital audio data represents music
324

Determine multiple times without receipt of user input that initiates such a determination, that the digital audio data does not represent audio that includes music
326

606
Recognize that digital audio represents a particular reference song from among a plurality of reference songs (cont.)

Compare characterization values for the digital audio data to characterization values for subset of reference songs 620

The characterization values for the digital audio data are real numbers, and the characterization values for each of the songs are limited to binary zeros and binary ones 622

Access the characterization values for each of the songs on the computing device without sending a request for relevant data to a remote computing device 624

Determine that the characterization values for a particular reference song are most relevant to the collection of characterization values for the digital audio data 626

Output an indication that the particular reference song is playing 628

Present a name of the particular reference song on a lock screen of the computing device 630

Present a name of the particular reference song in a notification panel of an unlocked screen of the computing device 632

FIG. 6B

DETERMINING THAT AUDIO INCLUDES MUSIC AND THEN IDENTIFYING THE MUSIC AS A PARTICULAR SONG

CROSS-REFERENCE TO RELATED APPLICATIONS

This application claims priority to U.S. Provisional Application Ser. No. 62/567,755, filed on Oct. 3, 2017, the entire contents of which are hereby incorporated by reference.

BACKGROUND

Many modern computing devices include microphones that are used for various purposes, such as recording audio of a phone call, identifying external noises for noise cancellation purposes, and receiving spoken input. Another use for microphones is to record audio that a computing device can then transmit to a remote server system for analysis and potential recognition as a song. This step of sending audio to a remote server system for analysis can be computationally expensive and slow.

SUMMARY

This document describes techniques, methods, systems, and other mechanisms for determining that detected audio represents or includes music and then identifying the music as a particular song. Devices implementing the mechanisms described herein can continuously perform such processes, so that by the time a user decides that they would like to know the name of a song that is playing over speakers in their current environment, the device may have already identified the song and output the song's title for display on a display device. In some examples, the music detection and song identification mechanisms described herein may execute entirely on a portable computing device, such that data generated by the portable computing device from ambient audio recordings is not transmitted to any remote electronic systems for analysis, thereby enabling the portable computing device to recognize and identify music when a network connection is not available. This functionality can thus eliminate the need to transmit locally recorded audio data to remote electronic systems for song recognition and identification.

In some examples, the music determination and song identification processes may be performed in two stages. A first stage may involve recognizing whether audio that the computing device has detected (based, for example, on a continuous monitoring process) represents or includes music. Because this first stage may operate continuously, or at least for extended durations of time, it may be performed by a low-power processor operatively coupled to or included in the computing device that is distinct from the main processor of the computing device. This low-power processor may operate at a lower voltage and clock rate than the main processor, thereby minimizing battery consumption attributable to the music detection process. The low-power processor may by physically separate from the main processor such that the low-power processor is housed in a different portion of the computing device (e.g., a separate circuit board, module, or housing) than the main processor.

After the low-power processor has determined that ambient audio represents or includes music, the main processor may perform a second stage that includes analyzing recorded audio in a song-identification process. The song identification process may involve two substeps. A first substep identifies a set of candidate songs by comparing characteristics of the recorded audio to an on-device dataset of thousands of reference songs that identifies characteristics of the thousands of reference songs. This first substep may use relatively low resolution characteristics to increase the speed by which candidate songs are identified. Once a set of candidate songs has been identified, the song identification process performs a second substep to identify which of the candidate songs (if any) match the recorded audio. The second substep may use relatively high resolution characteristics to maximize song-matching accuracy.

Once a song has been identified, the computing device may present an indication of the song that is currently playing. For instance, if the computing device is a smartphone and is "locked" (i.e., in a low- or no-access security state), the computing device may display the name of the song on a "lock screen" or "always on display screen" of the computing device. If the computing device is unlocked, the computing device may display the name of the song on a screen of the computing device (e.g., within a smartphone notification). Identifying songs in this continuous manner allows users to identify the name of songs without having to launch a specialized song identification application and then select a button to record audio. As such, users can identify which songs are playing over speakers in their environment without needing to stop activities in which they are participating to launch song identification applications on their computing devices. Moreover, it takes time to launch and run song identification applications, and songs may finish playing before users are able to launch and run such song identification applications. Further, devices are sometimes unable to identify songs, and automatic song identification processes limits the number of times that users would otherwise launch and run song identification applications only to be disappointed that the song identification application could not identify the song.

As additional description to the embodiments described below, the present disclosure describes the following embodiments.

Embodiment 1 is a computer-implemented method. The method comprises storing, by a computing device, reference song characterization data that identify a plurality of audio characteristics for each reference song in a plurality of reference songs. The method comprises receiving, by the computing device, digital audio data that represents audio recorded by a microphone. The method comprises determining, by the computing device and using a music determination process, whether the digital audio data represents music. The method comprises recognizing, by the computing device after determining that the digital audio data represents music, that the digital audio data represents a particular reference song from among the plurality of reference songs. The method comprises outputting, by the computing device in response to determining that the digital audio data represents a particular reference song from among the plurality of reference songs, an indication of the particular reference song.

Embodiment 2 is the computer-implemented method of embodiment 1, wherein the plurality of reference songs includes at least ten thousand reference songs, such that the reference song characterization data identify audio characteristics for the at least ten thousand reference songs.

Embodiment 3 is the computer-implemented method of any one of embodiments 1 or 2, wherein reference song characterization values for the reference songs in the plurality of reference songs are limited to a binary one or a binary zero, such that each characterization value is limited to a binary one or a binary zero.

Embodiment 4 is the computer-implemented method of any one of embodiments 1 through 3, wherein determining whether the digital audio data represents music includes: converting the digital audio data from time-domain format into a frequency-domain format, using the digital audio data in the frequency-domain format to the music determination process, and outputting an indication that the digital audio data represents music.

Embodiment 5 is the computer-implemented method of embodiment 4, wherein the music-determination process includes executing a machine learning system that has been trained to determine whether audio represents music.

Embodiment 6 is the computer-implemented method of any one of embodiments 1 through 5, wherein the computing device determines whether the digital audio data represents music without accessing the reference song characterization data that identify the plurality of audio characteristics for each reference song in the plurality of reference songs.

Embodiment 7 is the computer-implemented method of any one of embodiments 1 through 6, wherein determining whether the digital audio data represents music includes the computing device determining, multiple times without receipt of user input that initiates the music determination process, that the digital audio data does not represent music, before determining that the digital audio data represents music.

Embodiment 8 is the computer-implemented method of any one of embodiments 4 through 7, wherein the frequency-domain format is a first frequency-domain format and the frequency-domain conversion process is a first frequency-domain conversion process, and recognizing that the digital audio data represents the particular reference song includes: (i) converting the digital audio data from time-domain format into a second frequency-domain format during a second frequency-domain conversion process, (ii) using the digital audio data in the second frequency-domain format in a music-characterization process that receives the digital audio data in the second frequency-domain format and outputs a collection of characterization values for the digital audio data, and (iii) comparing the collection of characterization values for the digital audio data to a plurality of characterization values for each of at least a subset of the plurality of reference songs, to determine that the plurality of characterization values for the particular reference song are most relevant to the collection of characterization values for the digital audio data.

Embodiment 9 is the computer-implemented method of embodiment 8, wherein the second frequency-domain format and the first frequency-domain format analyze a different number of frequency bins.

Embodiment 10 is the computer-implemented method of any one of embodiments 8 or 9, wherein the music-characterization process is performed by a machine learning system that has been trained to characterize music.

Embodiment 11 is the computer-implemented method of any one of embodiments 8 through 10, wherein comparing the collection of characterization values for the digital audio data to the plurality of characterization values for each of at least a subset of the plurality of reference songs is performed by accessing the plurality of characterization values that are stored by the computing device for each of the at least subset of the plurality of songs without sending a request for song characterization data to another computing device.

Embodiment 12 is the computer-implemented method of any one of embodiments 8 through 11, wherein the computing device compares the collection of characterization values for the digital audio data to the plurality of characterization values for each of only the subset of the plurality of reference songs, and the method further comprises comparing the characterization values in the collection of characterization values for the digital audio data to the plurality of characterization values for each of the plurality of candidate songs to select the subset of the plurality of reference songs.

Embodiment 13 is the computer-implemented method of any one of embodiments 8 through 12, further comprising converting the characterization values in the collection of characterization values for the digital audio data from values that are not all limited to binary zeros and ones to values that are limited to binary zeros and ones; wherein comparing the characterization values in the collection of characterization values for the digital audio to the plurality of characterization values for each of the plurality of candidate songs includes a comparison in which: (a) the characterization values for the digital audio data are limited to binary zeros and binary ones, and (b) the characterization values for each of the plurality of songs are limited to binary zeros and binary ones.

Embodiment 14 is the computer-implemented method of any of embodiments 8 through 13, wherein comparing the collection of characterization values for the digital audio data to the plurality of characterization values for each of at least a subset of the plurality of reference songs includes a comparison in which: (a) the characterization values for the digital audio data include real numbers that represent values other than binary zeros and binary ones, and (b) the characterization values for each of the at least subset of the plurality of songs are limited to binary zeros and binary ones.

Embodiment 15 is the computer-implemented method of any one of embodiments 1 through 13, wherein: determining whether the digital audio data represents music is performed by a first processor of the computing device; and recognizing that the digital audio data represents a particular reference song from among the plurality of reference songs is performed by a second processor of the computing device.

Embodiment 16 is the computer-implemented method of embodiment 15, wherein the first processor operates at a lower voltage than the second processor.

Embodiment 17 is the computer-implemented method of embodiment 15, wherein the second processor operates from a clock signal that is at least an order of magnitude faster than a clock signal from which the first processor operates.

Embodiment 18 is the computer-implemented method of any one of embodiments 1 through 17, wherein outputting the indication that the particular reference song is playing includes presenting a name of the particular reference song on a lock screen of the computing device, in an always on screen of the computing device, or in a notification presented over an unlocked screen of the computing device, without user input having prompted the computing device to perform a song-identification process, other than enabling a continuous song-identification process.

Embodiment 19 is the computer-implemented method of any one of embodiments 1 through 17, wherein the computing device includes the microphone.

Embodiment 20 is directed to a computerized system, comprising: one or more processors; and one or more computer-readable devices including instructions that, when executed by the one or more processors, cause performance of the method in any one of embodiments 1 through 19.

Embodiment 21 is directed to a computing system. The computing system comprises a microphone configured to record an audio signal. The computing system comprises an analog-to-digital converter configured to generate digital audio data from a recorded audio signal. The computing system comprises one or more computer-readable memory devices that store: (i) reference song characterization data that identify a plurality of audio characteristics for each reference song in a plurality of reference songs, and (ii) instructions that are executable by processors and configure operation of the processors. The computing system comprises a first processor configured to output an indication that the digital audio data represents music upon determining that the digital audio data represents music. The computing system comprises a second processor configured to receive from the first processor the indication that the digital audio data represents music, and recognize that the digital audio data represents a particular reference song from among the plurality of reference songs. The computing system comprises a display device configured to present an identification of the particular reference song responsive to the second processor recognizing that the digital audio data represents the particular reference song from among the plurality of reference songs.

Embodiment 22 is the computing system of embodiment 21, wherein the computing system comprises a mobile computing device that includes the microphone, the analog-to-digital converter, the one or more computer-readable memory devices, the first processor, and the second processor.

Embodiment 23 is the computing system of any one of embodiments 21 or 22, wherein the first processor operates at a lower voltage or wattage than the second processor.

Embodiment 24 is the computing system of any one of embodiments 21 through 23, wherein the second processor operates from a clock signal that is at least an order of magnitude faster than a clock signal from which the first processor operates.

Embodiment 25 is the computing system of any one of embodiments 22 through 24, wherein the first processor is configured to output the indication that the digital audio data represents music and the second processor is configured to recognize that the digital audio data represents the particular reference song without the computing device sending the digital audio data to a computing system other than the computing device.

Embodiment 26 is the computing system of any one of embodiments 22 through 25, wherein the first processor is configured to output the indication that the digital audio data represents music and the second processor is configured to recognize that the digital audio data represents the particular reference song while the computing device is without a network connection to any external device.

Embodiment 27 is the computing system of any one of embodiments 22 through 26, wherein determining that the digital audio data represents music includes the first processor determining, multiple times without receipt of user input that initiates a music determination process, that the digital audio data does not represent music, before the first processor determines that the digital audio data represents music.

Embodiment 28 is the computing system of any one of embodiments 21 through 27, wherein reference song characterization values for the reference songs in the plurality of reference songs, stored by the one or more computer-readable memory devices, are limited to a binary one or a binary zero, such that each characterization value is limited to a binary one or a binary zero.

Embodiment 29 is the computing system of any one of embodiments 21 through 28, wherein the plurality of reference songs includes at least ten thousand reference songs, such that the reference song characterization data that is stored by the one or more computer-readable memory devices identify audio characteristics for the at least ten thousand reference songs.

Embodiment 30 is the computing system of any one of embodiments 21 through 29, wherein the first processor is configured to determine that the digital audio data represents music by: converting the digital audio data from time-domain format into frequency-domain format during a frequency-domain conversion process, and using the digital audio data in the frequency-domain format in a music-determination process that receives the digital audio data in the frequency-domain format and outputs the indication that the digital audio data represents music.

Embodiment 31 is the computing system of embodiment 30, wherein the music-determination process includes executing a machine learning system that has been trained to determine whether audio represents music.

Embodiment 32 is the computing system of embodiment 30, wherein the music-determination process includes executing a convolutional neural network on the low-power processor.

Embodiment 33 is the computing system of any one of embodiments 21 through 32, wherein the frequency-domain format is a first frequency-domain format and the frequency-domain conversion process is a first frequency-domain conversion process, and the second processor is configured to recognize that the digital audio data represents a particular reference song from among the plurality of reference songs by: (i) converting the digital audio data from time-domain format into a second frequency-domain format during a second frequency-domain conversion process, (ii) using the digital audio data in the second frequency-domain format in a music-characterization process that receives the digital audio data in the second frequency-domain format and outputs a collection of characterization values for the digital audio data, and (iii) comparing the collection of characterization values for the digital audio data to a plurality of characterization values for each of a subset of the plurality of reference songs, to determine that the plurality of characterization values for the particular reference song are most relevant to the collection of characterization values for the digital audio data.

Embodiment 34 is the computing system of embodiment 33, wherein the second frequency-domain format and the first frequency-domain format analyze a different number of frequency bins.

Embodiment 35 is the computing system of any one of embodiments 33 or 34, wherein the music-characterization process is performed by a machine learning system that has been trained to characterize music.

Embodiment 36 is the computing system of any one of embodiments 33 through 35, wherein comparing the collection of characterization values for the digital audio data to the plurality of characterization values for each of the subset of the plurality of reference songs is performed by accessing the plurality of characterization values that are stored by the computing device for each of the subset of the plurality of songs without sending a request for song characterization data to another computing device.

Embodiment 37 is the computing system of any one of embodiments 33 through 36, further comprising comparing the characterization values in the collection of characterization values for the digital audio data to the plurality of characterization values for each of the plurality of candidate songs to select the subset of the plurality of reference songs.

Embodiment 38 is the computing system of any one of embodiments 33 through 37, further comprising: converting the characterization values in the collection of characterization values for the digital audio data from values that are not all limited to binary zeros and ones to values that are limited to binary zeros and ones; and comparing the characterization values in the collection of characterization values for the digital audio data to the plurality of characterization values for each of the plurality of reference songs includes a comparison in which: (a) the characterization values for the digital audio data are limited to binary zeros and binary ones, and (b) the characterization values for each of the plurality of songs are limited to binary zeros and binary ones.

Embodiment 39 is the computing system of any one of embodiments 33 through 38, wherein comparing the collection of characterization values for the digital audio data to the plurality of characterization values for each of the subset of the plurality of reference songs includes a comparison in which: (a) the characterization values for the digital audio data include real numbers that represent values other than binary zeros and binary ones, and (b) the characterization values for each of the at least subset of the plurality of songs are limited to binary zeros and binary ones.

Embodiment 40 is a computer-implemented method. The method comprises storing, by a computing device, reference song characterization data that identify a plurality of audio characteristics for each reference song in a plurality of reference songs. The method comprises receiving, by the computing device, digital audio data that represents audio recorded by a microphone. The method comprises converting, by the computing device, the digital audio data from time-domain format into frequency-domain format. The method comprises using, by the computing device, the digital audio data in the frequency-domain format in a music-characterization process that outputs a collection of characterization values for the digital audio data, at least some of the characterization values representing values other than binary zeros and binary ones. The method comprises comparing, by the computing device, the collection of characterization values for the digital audio data to the plurality of characterization values for each of the plurality of reference songs, to select a subset of multiple candidate songs from the plurality of reference songs as those reference songs that correspond to the characterization values for the digital audio data. The method comprises comparing, by the computing device, the collection of characterization values for the digital audio data to a plurality of characterization values for each reference song in the subset of multiple candidate songs, to determine that the collection of characterization values for the digital audio data are most relevant to the plurality of characterization values for the particular reference song. The method comprises outputting, by the computing device in response to determining that the collection of characterization values for the digital audio data are most relevant to the plurality of characterization values for the particular reference song, an indication of the particular reference song.

Embodiment 41 is the computer-implemented method of embodiment 40, wherein the music-characterization process is performed by a machine learning system that has been trained to characterize music.

Embodiment 42 is the computer-implemented method of any one of embodiments 40 or 41, wherein comparing the collection of characterization values for the digital audio data to the plurality of characterization values for each reference song in the subset of multiple candidate songs is performed by accessing the plurality of characterization values that are stored by the computing device for each reference song in the subset of multiple candidate songs without sending a request for song characterization data to another computing device.

Embodiment 43 is the computer-implemented method of any one of embodiments 40 through 42, further comprising converting the collection of characterization values for the digital audio data from values that are not all limited to binary zeros and ones to values that are limited to binary zeros and ones; and wherein comparing the collection of characterization values for the digital audio data to the plurality of characterization values for each of the plurality of reference songs includes a comparison in which: (a) the collection of characterization values for the digital audio data are limited to binary zeros and binary ones, and (b) the characterization values for each of the plurality of songs are limited to binary zeros and binary ones.

Embodiment 44 is the computer-implemented method of any one of embodiments 40 through 43, wherein comparing the collection of characterization values for the digital audio data to the plurality of characterization values for each reference song in the subset of candidate songs includes a comparison in which: (a) the collection of characterization values for the digital audio data include real numbers that represent values other than binary zeros and binary ones, and (b) the characterization values for each reference song in the subset of candidate songs are limited to binary zeros and binary ones.

Embodiment 45 is the computer-implemented method of any one of embodiments 40 through 44, wherein the reference song characterization values for the reference songs in the plurality of reference songs are limited to binary zeros and binary ones, such that each characterization value is limited to a binary one or a binary zero.

Embodiment 46 is the computer-implemented method of any one of embodiments 40 through 45, wherein the plurality of reference songs includes at least ten thousand reference songs, such that the reference song characterization data identify audio characteristics for the at least ten thousand reference songs.

Embodiment 47 is the computer-implemented method of any one of embodiments 40 through 46, further comprising determining, by the computing device, whether the digital audio data represents music with a music determination process, wherein the computing device compares the collection of characterization values for the digital audio data to the plurality of characterization values for each of the plurality of reference songs after the computing device has determined that the digital audio data represents music with the music determination process.

Embodiment 48 is the computer-implemented method of any one of embodiments 40 through 47, wherein the frequency-domain format is a first frequency-domain format and the frequency-domain conversion process is a first frequency-domain conversion process, and determining whether the digital audio data represents music includes: converting the digital audio data from time-domain format into a second frequency-domain format during a second frequency-domain conversion process, and using the digital audio data in the second frequency-domain format in the music determination process, which receives the digital audio data in the second frequency-domain format and outputs an indication whether the digital audio data represents music.

Embodiment 49 is the computer-implemented method of any one of embodiments 47 or 48, wherein the music-determination process includes executing a machine learning system that has been trained to determine whether audio represents music.

Embodiment 50 is the computer-implemented method of any one of embodiments 47 through 49, wherein the computing device determines whether the digital audio data represents music without accessing the reference song characterization data that identify the plurality of audio characteristics for each reference song in the plurality of reference songs.

Embodiment 51 is the computer-implemented method of any one of embodiments 47 through 50, wherein the computing device determining whether the digital audio data represents music with the music determination process includes the computing device determining, multiple times without receipt of user input that initiates the music determination process, that the digital audio data does not represent music, before determining that the digital audio data represents music.

Embodiment 52 is the computer-implemented method of any one of embodiments 47 through 51, wherein the second frequency-domain format and the first frequency-domain format analyze a different number of frequency bins.

Embodiment 53 is the computer-implemented method of any one of embodiments 47 through 52, wherein: determining whether the digital audio data represents music is performed by a first processor of the computing device; comparing the collection of characterization values for the digital audio data to the plurality of characterization values for each of the plurality of reference songs is performed by a second processor of the computing device; and comparing the collection of characterization values for the digital audio data to the plurality of characterization values for each reference song in the subset of multiple candidate songs is performed by the second processor of the computing device.

Embodiment 54 is the computer-implemented method of embodiment 53, wherein the first processor operates at a lower voltage or wattage than the second processor.

Embodiment 55 is the computer-implemented method of any one of embodiments 53 or 54, wherein the second processor operates from a clock signal that is at least an order of magnitude faster than a clock signal from which the first processor operates.

Embodiment 56 is the computer-implemented method of any one of embodiments 40 through 55, wherein outputting the indication of the particular reference song includes presenting a name of the particular reference song on a lock screen of the computing device, in an always on screen of the device, or in a notification presented over an unlocked screen of the computing device, without user input having prompted the computing device to perform a song-identification process, other than enabling a continuous song-identification process.

Embodiment 57 is directed to a computerized system, comprising: one or more processors; and one or more computer-readable devices including instructions that, when executed by the one or more processors, cause performance of the method in any one of embodiments 40 through 56.

The details of one or more examples are set forth in the accompanying drawings and the description below. Other features, objects, and advantages will be apparent from the description and drawings, and from the claims.

DESCRIPTION OF DRAWINGS

FIGS. 3A-B show a diagram of an example process for determining that music is currently playing in a current environment of the example computing device.

FIGS. 6A-B show a diagram of an example process for identifying a song that is currently playing in a current environment of the example computing device.

Like reference symbols in the various drawings indicate like elements.

DETAILED DESCRIPTION

This document generally describes mechanisms for determining that detected ambient audio represents or includes music and then identifying a song that is contained in the ambient audio. This disclosure initially describes the main aspects of this process with reference to FIG. 1 and then provides additional detail of the processes with reference to FIG. 2-10.

Figure 1:
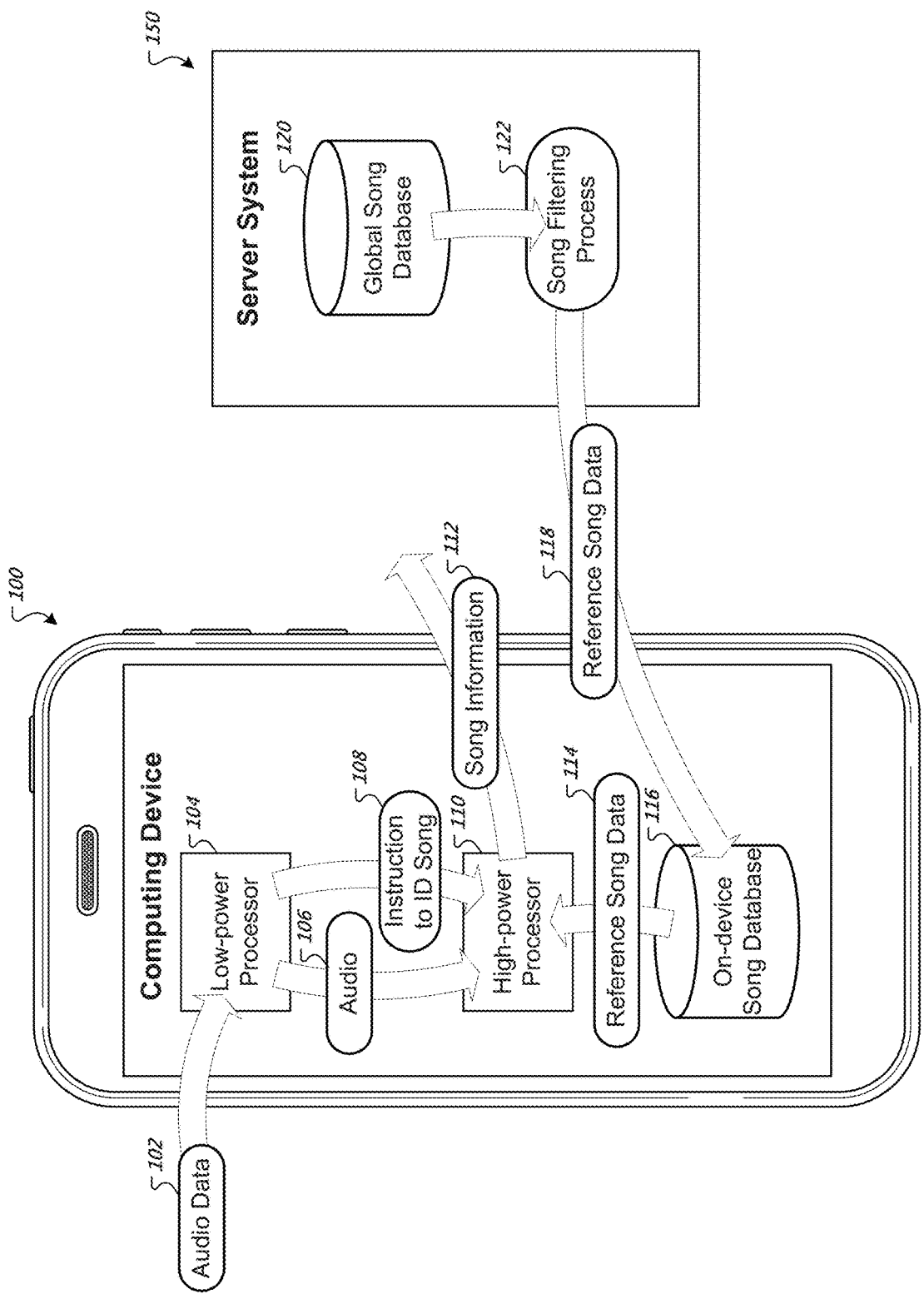
FIG. 1 shows a computing device that performs automatic music determination and song identification and a remote server system that provides the computing device with reference song data.

FIG. 1 shows a computing device 100 that performs automatic music determination and song identification, and a remote server system 150 that provides the computing device 100 with reference song data. A computing device 100 is illustrated in FIG. 1 as a touchscreen smartphone, but computing device 100 may be other types of mobile and non-mobile computing devices, such as tablets, smart watches, desktop computers, and smart appliances.

The computing device 100 is configured to continuously record audio data 102 and analyze the audio data 102 to determine whether music is contained in the detected ambient audio. The audio data 102 is recorded in analog format with a microphone, and is thereafter provided to a low-power processor 104 that converts the audio data 102 from analog format into digital format.

The low-power processor 104 stores the digitally formatted audio data 102 in a buffer and converts the audio data 102 from time-domain format to frequency-domain format to facilitate analysis of the audio data 102 (e.g., by performing a fast Fourier transform on the audio data 102). The low-power processor 104 may perform this conversion process regularly at some interval (e.g., every 10 milliseconds, every 20 milliseconds, every 40 milliseconds, or another suitable value). The fast Fourier transform may operate over a window that is larger than the interval (e.g., it may operate over a 25 ms window with a 10 ms step).

The low-power processor 104 stores a buffer of some number of seconds (e.g., five seconds, ten seconds, twenty seconds, or another value) of these arrays such that, for each interval (e.g., 10-millisecond interval, 20-millisecond interval, 40-millisecond interval) over the last number of seconds (e.g., five seconds), the computing device has identified the power of frequency content in each of a number of different "bins" of frequency ranges (e.g., 32 bins, 64 bins, 128 bins). The buffer may be a circular buffer, such that arrays that are over a number of seconds old (e.g., over 5 seconds old) are replaced by newly-generated arrays. The low-power processor 104 may perform this process continuously (i.e., repeatedly at regular intervals without requiring repeated user input initiating the process).

At regular intervals (e.g., each 1 second, each 2 seconds, each 5 seconds), the low-power processor 104 analyzes the 5-second buffer to determine whether the recently-acquired audio data 102 represents music that is playing in the ambient environment in which the computing device 100 is located. In some examples, this analysis is performed by a machine-learning system executing on the low-power processor 104, such as a convolutional neural network. The machine-learning system may have been trained at a separate computing system by passing into the machine learning system tens of thousands of audio recordings along with indications of whether each audio recording represented music. These inputs eventually train the machine-learning system, and this trained machine-learning system may then be transferred to the computing device 100 and other devices like it (e.g., by transferring machine-learning system configuration data). Computing device 100 may receive occasional updates to the machine-learning system.

The low-power processor 104 may generate a buffer of music estimation decisions (e.g., confidence values, and/or "yes" or "no" determinations at each interval (e.g., each 1 second, each 2 seconds, each 5 seconds)) to identify whether the audio data 102 represents music. The low-power processor 104 may store these music estimation decisions in yet another buffer, and may analyze a recent history of the music estimation decisions to determine whether they meet predetermined criteria to output an indication that music is indeed playing in the ambient environment in which the computing device 100 is located. In some examples, the low-power processor 104 may output a decision that music is playing if at least a particular fraction of previous determinations (e.g., five of the last seven 1-second determinations) indicate "yes" (i.e., that the detected ambient audio includes music). This "voting" over seven separate determinations, for example, increases the reliability of the music-determination decision that is output by the low-power processor 104, and ensures that the low-power processor 104 does not indicate that music is playing if only a two- or three-second clip of music plays (e.g., in a television advertisement). The voting is also useful if there are some spurious positive classifications.

After the low-power processor 104 has determined that music is contained in the detected ambient audio, the low-power processor sends to the high-power processor 110 an instruction 108 to cause the high-power processor 110 to identify the song that is playing. The low-power processor 104 also sends, to the high-power processor 110, underlying audio data 106 on which the low-power processor 104 based its determination that music was playing. The low-power processor 104 sends the underlying audio data 106 in its time domain format because the high-power processor may generate a higher-resolution frequency-domain representation of the audio data 102 relative to the representation generated by the low-power processor 104. The buffer which the low-power processor 104 sends to the high-power processor 110 can be a different size from the classification window (e.g., it might be the last 8 seconds, even though the classification may be performed over the last 5 seconds).

The high-power processor 110 receives the audio data 106 and converts the audio data 106 to frequency-domain format in preparation for analysis of the audio data 106. The frequency-domain conversion may be performed using a fast Fourier transformation process, and may generate a relatively high-resolution frequency-domain representation of the audio data 106, which includes a particular number of bins (e.g., 256 bins, 512 bins, 1024 bins) of values for each conversion (e.g., to generate an array with a length that corresponds to the number of bins). The high-power processor 110 may run the frequency-domain conversion process at regular intervals (e.g., 46-millisecond intervals, 92-millisecond intervals, 184-millisecond intervals) across the audio data 106 that the high-power processor 110 received from the low-power processor 104. The high-power processor 110 may store the generated arrays in a buffer. As such, the high-power processor 110 takes a time-domain version of the audio data 106 from the low-power processor 104 and fills a buffer with arrays of values that represent a frequency-domain version of the audio data 106.

The high-power processor 110 then analyzes the frequency-domain audio data 106 that is stored in the buffer to characterize the audio data 106. For example, the high-power processor 110 may provide the frequency-domain audio data 106 to a machine learning system (e.g., a neural network) that has been trained to generate a set characterization values, each set of characterization values having a number of values (e.g., 48 values, 96 values, 192 values, or another suitable number of values) that characterize audio. In this example, rather than generating a single set of values to characterize all of the audio data 106 in the buffer, the high-power processor 110 may run its characterization process at one-second intervals across the buffer, characterizing two second portions of audio data 102 each time. As such, if the buffer were eight seconds long, the high-power processor 110 would generate seven sets of characterization values (one set from 0-2 seconds, another from 1-3 seconds, another from 2-4 seconds, and so forth). Each characterization value may be a real number that is stored in a "float" value (e.g., the number may be 0.783 that includes the "783" value in the fractional portion of the real number). Prior to analyzing the audio data 106 in the buffer with the machine learning system, the high-power processor 110 may process the values in the buffer, for example, by providing frequency bin weighting or feature scaling/normalization (e.g., mean of 0, standard deviation of 1).

The high-power processor 110 creates this characterization data to compare the audio data 106 that the computing device 100 recorded to similarly-created reference song characterization data 118 that the computing device 100 stores for thousands of songs in an on-device song database 116. The computing device 100 may populate the on-device song database 116 with reference song characterization data 118 received from a remote server system 150. The remote server system 150 may include a global song database 120 that stores song characterization data for hundreds of thousands or even millions of songs, and may select which song characterization data to send to computing device 100 using a song filtering process 122.

For example, the global song database 120 may include characterization data for songs that are popular all over the world, but may only send to the computing device 100 the reference song characterization data 118 for a subset of songs. For example, the reference song characterization data 118 that is sent to the computing device 100 may include only songs that are popular in North America, as a result of the remote server system 150 determining that computing device 100 is located in North America. The remote server system 150 may periodically send an updated list of reference song data 118 to the computing device 100 as different songs are determined to be the popular in the geographic region in which the computing device 100 is located. The criteria for selecting reference song characterization data 118, from among all songs in the global song database 120, can be based on factors other than geographic location, such as various combinations of user age (e.g., pop music for younger individuals and classic songs for older individuals), storage capacity of the device (e.g., more song data for larger capacity devices or devices for which the user permits storage of more song characterization data), time of day (e.g., disco at night and workout songs in the morning, based on user preferences), time of year (e.g., more holiday music in December), and user interests (e.g., based on information collected from social network profiles or messages). Collection and use of such personalized data may be performed in response to an opt-in request of a user, such that personalized data may not be accessed or used unless a user specifically requests that such data be used to personalize the information in the reference song characterization data 118. The reference song characterization data 118 may have been generated using a similar or same characterization process as that described above with respect to the process performed on the recorded audio data 106 at the computing device 100. In other words, the remote server system 150 may generate, for each reference song, a number or characterization values (e.g., 48 values, 96 values, 192 values, or another suitable number of values) at one-second intervals across the reference song. The reference song characterization data 118 may be stored in a binary format, with each of the characterization values being either a "0" or a "1," rounded down or up from their nominal values, to save storage space and facilitate quick comparisons. On the other hand, the characterization data generated by the computing device 100 may store its characterization values as real numbers (e.g., a real number that is stored in a "float" value, such as 0.783).

Once the high-power processor 110 has characterized the audio data 106 by converting audio data 106 into song characterization data (e.g., using a machine learning system), the high-power processor 110 may compare that song characterization data to the reference song characterization data 114 to determine if the recorded audio data 106 matches any song represented in the on-device song database 116. This comparison process may be performed in two substeps. In a first substep, the high-power processor 110 performs a lightweight comparison across the entire set of songs represented in the on-device song database 116 to identify a group of candidate songs that are similar to the audio data 106 that the computing device recorded. These candidate songs are the candidates for a more-detailed analysis that is performed in a second substep.

In some examples, this lightweight comparison to identify candidate songs involves selecting a subset of the characterization values generated from the audio data 106 (e.g., 64 values, 48 values, 32 values, or another suitable number of values) and converting each of those values to either a binary "0" or a binary "1" (using a rounding process). The high-power processor 110 then compares the subset of the binary characterization values generated from the recorded audio data 106 to the corresponding 64 binary characterization values stored in the on-device song database 116 for each one-second interval of each of the thousands of reference songs. This process can involve hundreds of thousands of comparisons. For example, there are seven sets of characterization values generated from the recorded audio 106, and each of these sets of characterization values may be compared to each set of characterization values stored for each 1 second interval of each song represented in the on-device song database 116. Assuming that each song is roughly 200 seconds long, for example, this means that the comparison process would involve 1400 comparisons for each song in the on-device song database 116. The high-power processor 110 may perform these comparisons relatively quickly because the compared values are both in binary and therefore a processor comparison instruction may be employed.

Once the high-power processer 110 has generated a list of candidate songs (e.g., those songs for which there was a match to the recorded audio data 106 or for which a similarity-comparison process generated a high similarity score), the high-power processor 110 may perform a second substep, which involves a more-detailed comparison of the recorded audio data 106 to the candidate songs. This more-detailed comparison can involve using the entire sets of characterization values (e.g., e.g., 48 values, 96 values, 192 values, or another suitable number of values) in their real-value format (i.e., not their binary representation, as with the candidate-identification process), and comparing these sets of characterization values against corresponding sets of characterization values in the on-device song database.

The use of real values (e.g., values with decimal points) in the comparison process yields outputs that are not simply a "match" or "not match," but outputs that include arrays of values that each indicate the similarity between a set of characterization values for the recorded audio data 106 and a set of characterization values for a corresponding set of the reference song characterization data 118. After performing hundreds of thousands of comparisons, the high-power processor 110 identifies the candidate song with the greatest similarity to the recorded audio data 106 as the song that is currently playing in the ambient environment, at least should a similarity value between the characterization values for the candidate song and the characterization values for the recorded audio data 106 exceed a pre-determined threshold.

In some examples, the computing device 100 visually or audibly indicates that it has identified a song that is playing in the ambient environment. For example, the computing device 100 may present song information 112 (e.g., song title and artist name) on a display of the computing device 100. For example, the computing device 100 may present the song information 112 in a notification or as part of a background display.

The rest of this disclosure steps through this process in additional detail with reference to the remaining figures.

Figure 2:
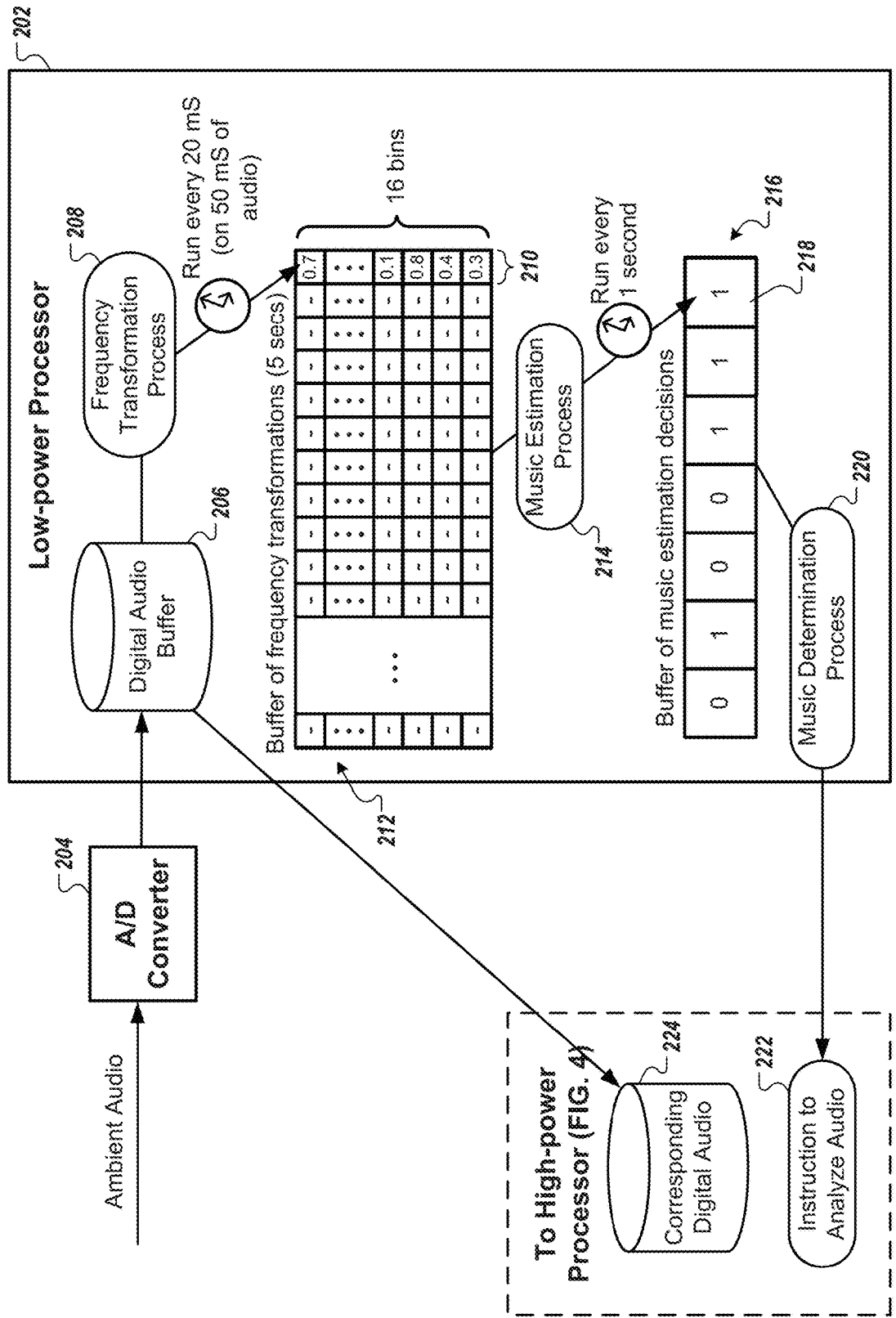
FIG. 2 is a conceptual diagram of example computing device components, operations, and data structures used for detecting and determining that music is currently playing in a current environment of the example computing device.

FIG. 2 is a conceptual diagram of example computing device components, operations, and data structures used for detecting and determining that music is currently playing in a current environment of the example computing device. As shown in FIG. 2, for example, low-power processor 202

(e.g., similar to the low-power processor 104, shown in FIG. 1) can be used to continuously process digital audio data, and to determine whether the digital audio data represents music. The low-power processor 202, for example, can be a specialized digital signal processor (DSP) included on a specialized audio codec chip for processing signals from a device microphone, with the low-power processor 202 operating at a lower voltage or wattage than a main processor (e.g., a central processing unit (CPU)), and which operates from a clock signal that is at least five, ten, twenty, or thirty times slower than that of the main processor. Thus, the low-power processor 202 can continuously monitor ambient sounds detected by the device microphone, while consuming a low amount of device battery power (e.g., less than 1% of battery capacity). Components, operations, and data structures used by the low-power processor 202 for determining that music is contained in detected ambient audio are described in further detail with respect to FIGS. 3A-B.

Figure 3A:
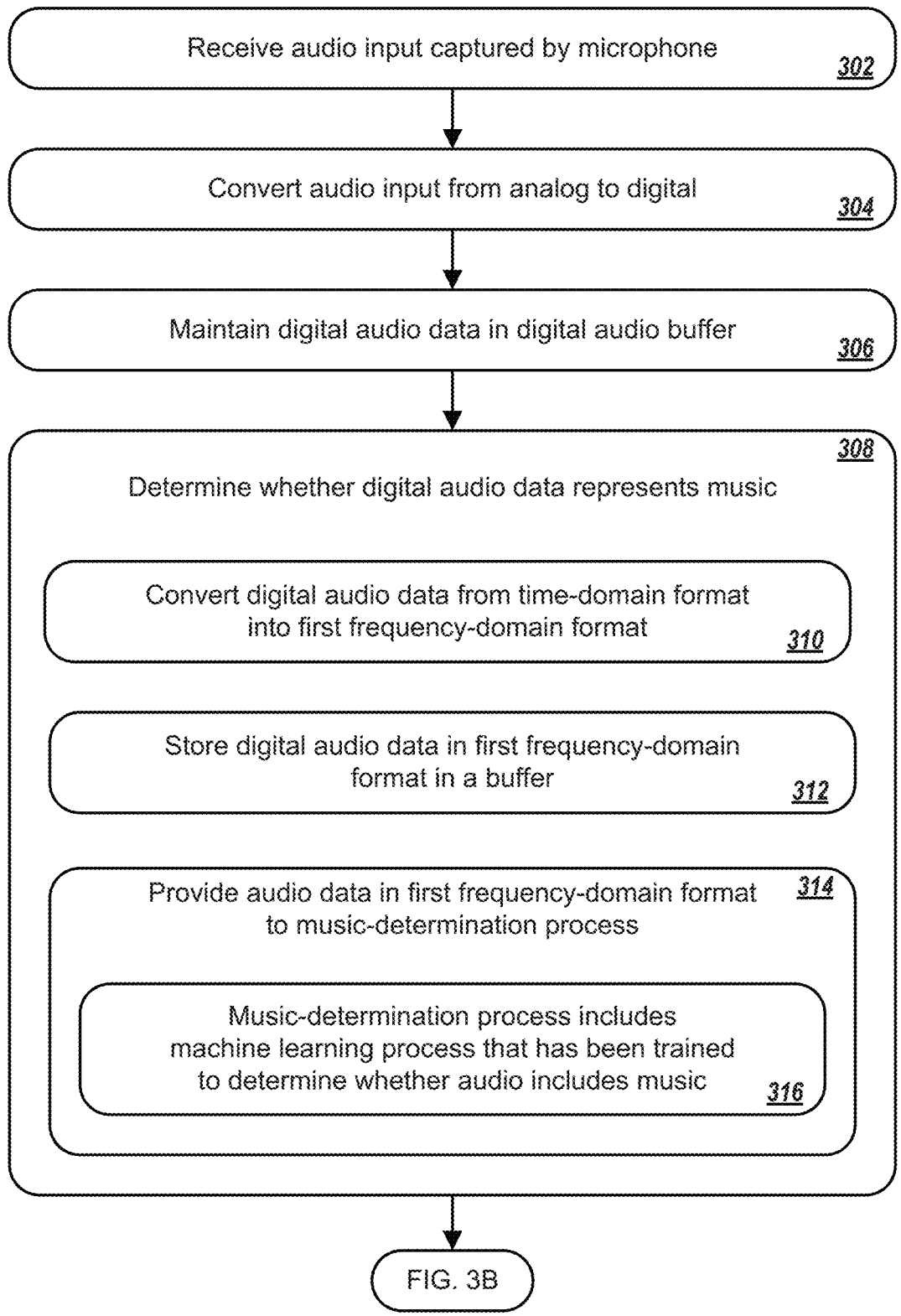

~FIGS. 3A-B show a diagram of an example process for determining that music is currently playing in a current environment of the example computing device. In general, the process can be continuously performed without explicit user input. For example, at some point in time prior to initiating the process, the user can modify a device configuration setting that provides the device with an instruction to continuously perform the process while the device is powered on. Thereafter, the device will perform the process whenever the device is on, without further user input. Operations for determining that music is contained in detected ambient audio can be performed by the low-power processor 202 (shown in FIG. 2), for example.

At box 302, audio input captured by a microphone is received. For example, the computing device 100 (shown in FIG. 1) can continuously monitor and record ambient sounds detected by its microphone.

At box 304, the audio input is converted from analog to digital format. Referring now to FIG. 2, an ambient audio signal (e.g., an analog audio signal generated by a device microphone) is received by an analog-to-digital (A/D) converter 204. The analog-to-digital converter 204 can convert the analog audio signal into digital audio data in time-domain format. In some examples, the analog-to-digital converter 204 can be implemented as an integrated circuit, separate from the low-power processor 202. In some examples, the analog-to-digital converter 204 can be implemented on the low-power processor 202.

At box 306, the digital audio data is maintained in a digital audio buffer. For example, the analog-to-digital converter 204 can output a continuous stream of digital audio data, which is stored in a digital audio buffer 206 of the low-power processor 202. In some examples, the digital audio buffer 206 can be a circular buffer, such that digital audio that is older than a specified number of seconds (e.g., four seconds, eight seconds, sixteen seconds) is written over by newly received digital audio data.

At box 308, a determination of whether the digital audio data represents music is performed. For example, the low-power processor 202 can continuously process a stream of digital audio data from the digital audio buffer 206 and, based on the processing, can periodically determine whether a particular segment of the digital audio data represents music.

At box 310, determining whether digital audio data represents music includes converting the digital audio data from a time-domain format into a first frequency-domain format during a first frequency-domain conversion process. For example, the low-power processor 202 can periodically (e.g., at time intervals of 10 milliseconds, 20 milliseconds, 40 milliseconds, or another suitable time interval) perform a frequency transformation process 208 in which a specified time window (e.g., 25 milliseconds, 50 milliseconds, 100 milliseconds, or another suitable time window) of digital audio data from the digital audio buffer 206 is converted from a time-domain format to the first frequency-domain format. In the present example, the low-power processor 202 performs the frequency transformation process 208 once every 20 milliseconds, each time sampling and processing the most-recent fifty milliseconds of digital audio from the digital audio buffer 206. The frequency transformation process 208 outputs a data frame 210, for example, which includes values for a specified number of bins (e.g., sixteen bins, thirty-two bins, sixty-four bins, or another suitable number of bins), each bin being associated with a frequency range and having an associated value that represents an intensity of audio at the frequency range during the sampling time period. In the present example, the data frame 210 includes sixteen bins, each bin being associated with a different portion of an audio range (e.g., an audible audio range), and each bin being assigned a float value that represents an intensity of audio at that portion of the audio range. In some examples, the frequency transformation process 208 can use a fast Fourier transform (FFT) algorithm to convert sampled portions of digital audio data from time-domain format into data frames in the first frequency-domain format.

At box 312, determining whether digital audio data represents music includes storing the digital audio data in the first frequency-domain in a buffer. For example, the low-power processor 202 can add the data frame 210 (e.g., representing the most recent fifty milliseconds of digital audio from the digital audio buffer 206) to a buffer of frequency transformations 212, which includes a series of data frames that have been generated by the frequency transformation process 208 during previous sampling periods. In the present example, the buffer of frequency transformations 212 includes data frames that have been generated over the past five seconds. In some examples, the buffer of frequency transformations 212 can be a circular buffer, such that data frames that are older than a specified number of seconds (e.g., five seconds) are written over by newly generated data frames.

At box 314, determining whether digital audio data represents music includes providing the digital audio data in the first frequency-domain format to a music-determination process that receives the digital audio data in the first frequency-domain format. For example, as part of the music-determination process, the low-power processor 202 can periodically (e.g., once per second) perform a music estimation process 214 over some or all of the previously generated data frames that are stored in the buffer of frequency transformations 212. In the present example, the music estimation process 214 receives as input the entire buffer of frequency transformations 212, which includes the last five seconds of sampled audio data that is stored in the first frequency-domain format.

At box 316, the music-determination process includes a machine learning system that has been trained to determine whether audio data represents music. For example, to determine whether the buffer of frequency transformations 212 represents music, the music estimation process 214 can include referencing a machine-learning model that has been trained off-line (e.g., previously at the server system 150), and provided to the low-power processor 202. The machine-learning model can be used to perform a binary classification with respect to whether digital audio data in the first frequency-domain format (e.g., a series of data frames in the buffer of frequency transformations 212) represents music or does not represent music. In some examples, the machine-learning model can be a small, quantized convolutional neural network which runs continuously on the low-power processor 202.

At box 320, determining whether digital audio data represents music includes maintaining values that indicate whether digital audio data represents music, in a buffer of music estimation decisions 216. For example, after performing the music estimation process 214, the low-power processor 202 can add a binary value 218 that represents whether the digital audio data in the first frequency-domain format represents music (e.g., a value of one indicating music, and a value of zero indicating not music) in the buffer of music estimation decisions 216. In some examples, the buffer of music estimation decisions 216 can be a circular buffer, such that a specified number of most recent music estimation decision values are maintained (e.g. seven), and that older decision values are overwritten by new decision values.

At box 322, determining whether digital audio data represents music includes determining whether prior music estimation decisions meet pre-determined criteria for outputting an indication that digital audio represents music. For example, after adding the binary value 218 to the buffer of music estimation decisions 216, the low-power processor 202 can perform a music determination process 220 that receives as input some or all of the prior music estimation decisions in the buffer of music estimation decisions 216. In the present example, the music determination process 220 receives as input the entire buffer of music estimation decisions 216, which includes the prior seven music estimation decisions, each of the decisions being generated at one-second intervals. In some examples, the pre-determined criteria for outputting an indication that digital audio represents music includes determining whether a threshold number of prior music estimation decisions in the buffer of music estimation decisions 216 (e.g., five out of seven) indicate that the digital audio data in the first frequency-domain format represents music. In some examples, the pre-determined criteria for outputting an indication that digital audio represents music includes determining whether a threshold number of consecutive prior music estimation decisions in the buffer of music estimation decisions 216 (e.g., four consecutive decisions) indicate that the digital audio data in the first frequency-domain format represents music.

At box 324, determining whether digital audio data represents music includes outputting an indication that the digital audio data represents music. For example, in response to the music determination process 220 determining that the digital audio data in the first frequency-domain format represents music, the low-power processor 202 can provide an instruction to analyze audio 222 to a high-power processor 402 (shown in FIG. 4), and can provide corresponding digital audio 224 from the digital audio buffer 206. In the present example, the entire contents of the digital audio buffer 206 (e.g., including the previous eight seconds of recorded digital audio data, in time-domain format) are provided to the high-power processor for further processing.

At box 326, determining whether digital audio data represents music includes determining, multiple times (e.g., thousands of times) without receipt of user input that initiates a music determination process, that the digital audio data does not represent music, before determining that the digital audio data represents music. For example, the computing device 100 may continuously monitor ambient sounds for music, determining that music is not present. When music is present (e.g., music begins playing in the device's proximity, or the device is transported to a location with music) the computing device 100 can detect the music without any input from a device user to initiate a process for determining the music.

Figure 4:
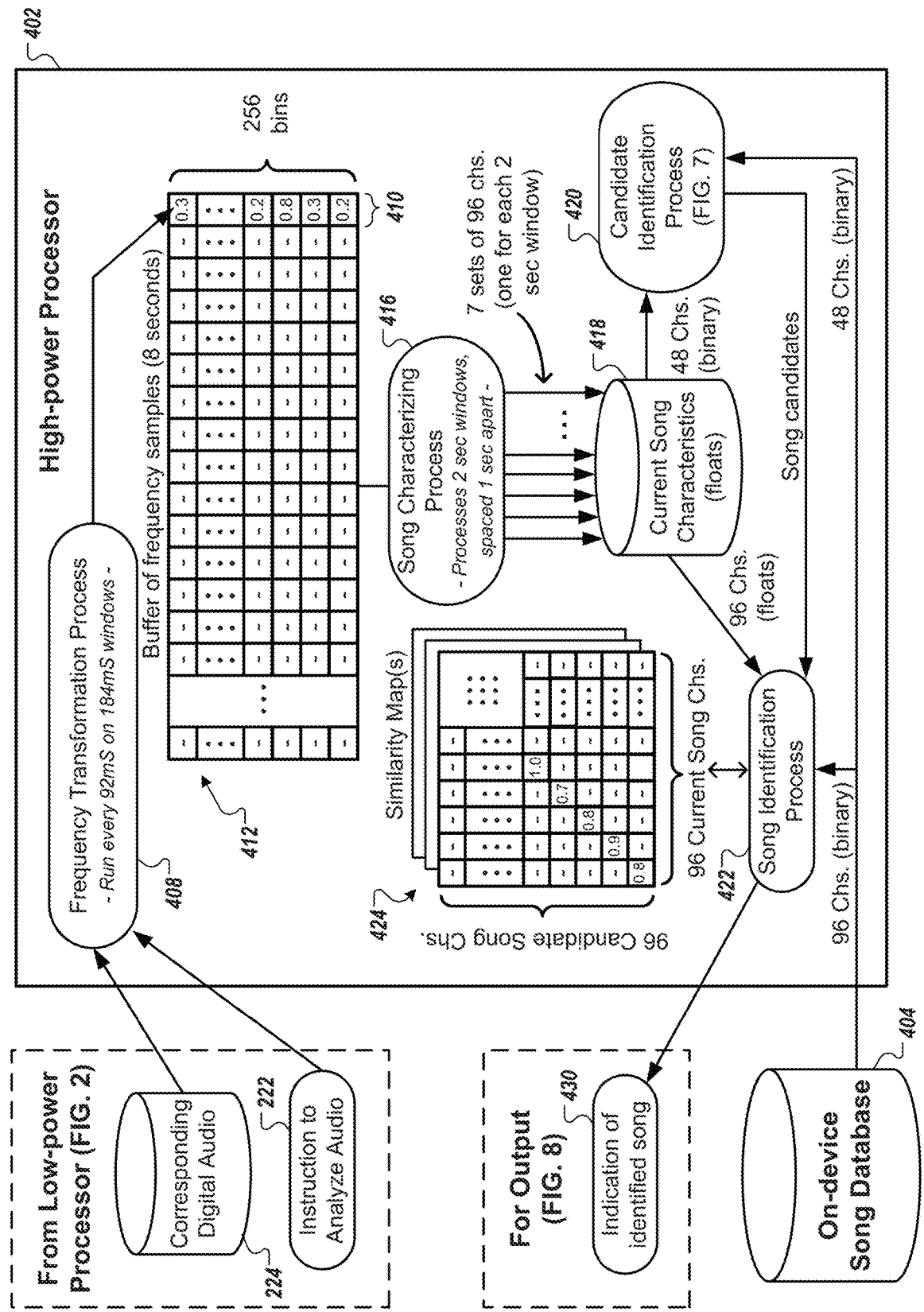
FIG. 4 is a conceptual diagram of example computing device components, operations, and data structures used for receiving and storing reference song data, and for identifying a song that is currently playing in a current environment of the example computing device.

FIG. 4 is a conceptual diagram of example computing device components, operations, and data structures used for receiving and storing reference song data, and for identifying a song that is currently playing in a current environment of the example computing device. As shown in FIG. 4, for example, high-power processor 402 (e.g., similar to the high-power processor 110, shown in FIG. 1) can be used to determine whether data that represents a song that is playing matches data that represents a song that is stored in an on-device song database 404 (e.g., similar to the on-device song database 116, shown in FIG. 1). The high-power processor 402, for example, can be a main processor (e.g., a central processing unit (CPU)) of a device, which operates at a higher voltage or wattage than the low-power processor 202 (shown in FIG. 2), and which operates from a clock signal that is at least an order of magnitude faster (e.g., five, ten, twenty, or thirty times faster) than that of the low-power processor 202. In some examples, the high-power processor 402 may include two or more CPU cores. In some examples, the on-device song database 404 can be implemented using persistent memory, and some or all of the data in the on-device song database 404 can be loaded into the device's random access memory (RAM) to facilitate song identification processes. Components, operations, and data structures for receiving and storing reference song data in the on-device song database 404 are described in further detail with respect to FIG. 5. Components, operations, and data structures used by the high-power processor 402 for identifying a song that is playing are described in further detail with respect to FIGS. 6A-6B.

Figure 5:
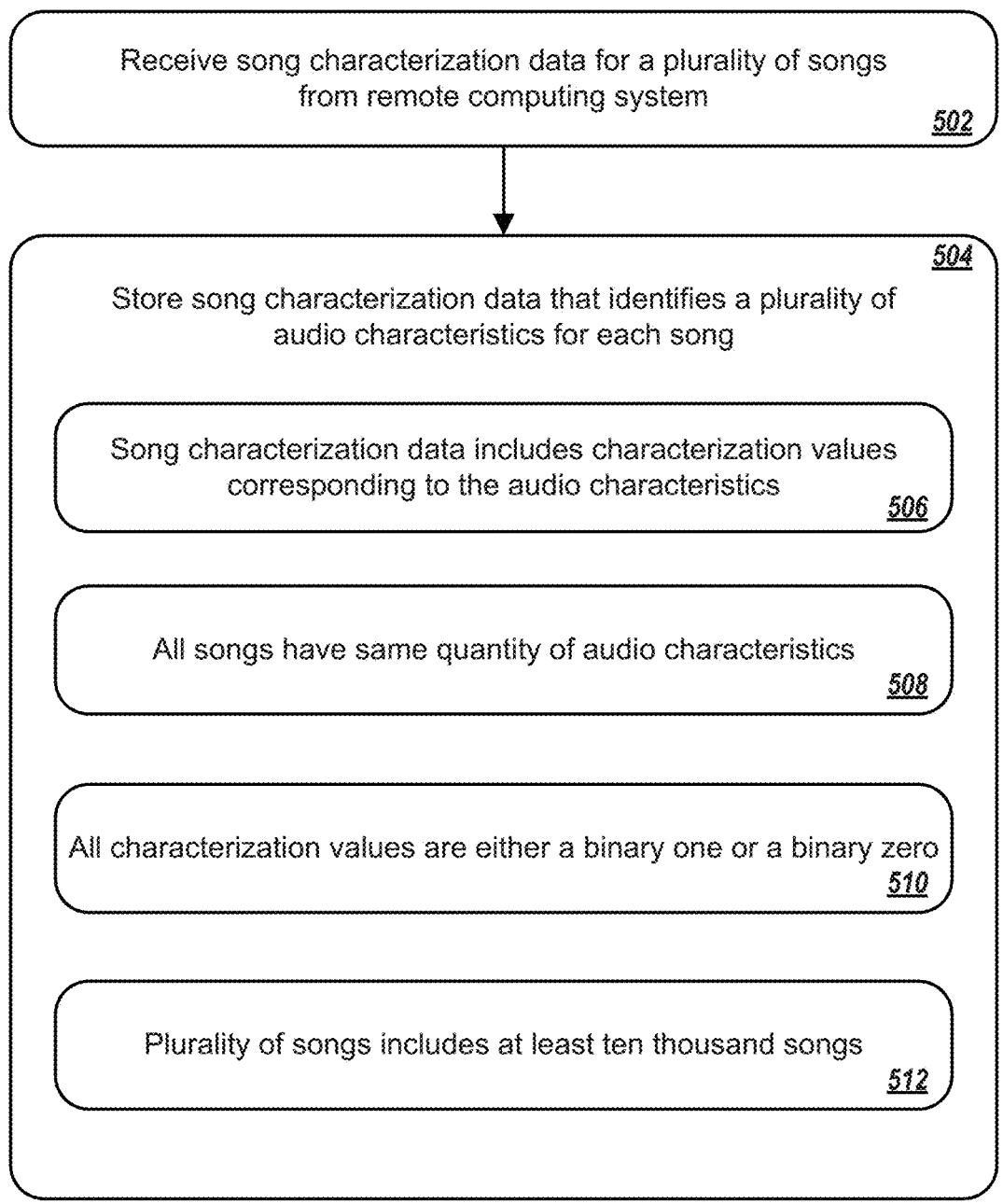
FIG. 5 shows a diagram of an example process for receiving and storing reference song data.

FIG. 5 shows a diagram of an example process for receiving and storing reference song data. In general, the process can be performed periodically (e.g., daily, weekly), can be performed in response to changes in device context (e.g., a change in device location), and/or can be performed in response to user input. Referring to FIG. 1, for example, data that represents new songs can be added to the global song database 120, and in response, reference song data 118 can be provided to the computing device 100 for storage in the on-device reference song database 116. As another example, a location of the computing device 110 can change, and in response, reference song data 118 that may be relevant to a current location of the computing device 110 can be provided for storage in the on-device reference song database 116. As another example, a user of the computing device 110 can provide specific input to trigger a request to the server system 150 to provide updated reference song data 118 for storage in the on-device reference song database 116.

At box 502, reference song characterization data is received by a computing device from a remote computing system. Referring again to FIG. 1, for example, the computing device 100 receives reference song data 118 from the server system 150. Songs that are represented by the reference song data 118 can be selected by the server system 150 from the global song database 120 using the song filtering process 122, for example, which can be used to select a customized set of songs for the computing device 100, based on factors such as a location of the device, musical interests of a device user, and other relevant factors.

Reference song characterization data for a song includes data that characterizes the song, the data having been generated by a song characterizing process which uses a neural network to generate a set of feature vectors for each of a series of time windows included in the song. In general, a process for generating the set of feature vectors for the song can include converting digital audio of the song from a time-domain format into a frequency-domain format (e.g., using a fast Fourier transform (FFT) algorithm), then generating a fingerprint for the song by providing the frequency-domain formatted data to the neural network. The song fingerprint can include, for each two second window included in the song, for example, a set of ninety-six feature vectors.

In some examples, a smoothing process can be performed on each of the feature vectors such that a particular feature vector value for a given time window is adjusted based on corresponding feature vector values for preceding and/or following time windows. For example:

smoothed_value[$t$]=

1*value[$t-2$]+

3*value[$t-1$]+

4*value[$t$]+

3*value[$t+1$]+

1*value[$t+2$]

In some examples, the feature vector values can be converted from float values to binary values. For example, feature vector values can include positive and negative values from a distribution with a zero mean. After smoothing each of the feature vector values, for example, the values can be converted to a binary value such that positive values are mapped to true (e.g., 1), and that zero values and negative values are mapped to false (e.g., −1). In some examples, the smoothed_value[t] is generated for each value in the particular feature vector. By binarizing and smoothing the feature vector values, for example, a compact fingerprint can be generated for each of the songs.

At box 504, reference song characterization data that identify a plurality of audio characteristics for each reference song in a plurality of reference songs is stored. Referring now to FIG. 4, reference song characterization data (e.g., the reference song data 118, shown in FIG. 1) can be stored in the on-device song database 404.

At box 506, the reference song characterization data stored for each reference song in the plurality of reference songs includes a plurality of reference song characterization values that correspond to the plurality of audio characteristics. In the present example, each two second window of the song is associated with ninety-six song characterization values, each song characterization value being for a different audio characteristic.

At box 508, the reference song characterization data stored for all reference songs in the plurality of reference songs has a same quantity of audio characteristics. In the present example, each song is associated with ninety-six audio characteristics.

At box 510, the reference song characterization values for all reference songs in the plurality of reference songs are either a binary one or a binary zero (i.e., each value is limited to a binary one or a binary zero). In the present example, for each song and each two second window the song, each song characteristic is assigned either a binary one or a binary zero.

At box 512, the plurality of reference songs includes at least ten thousand reference songs, such that the reference song characterization data identify audio characteristics for at least ten thousand reference songs. Since each of the songs is associated with a compact yet detailed fingerprint, for example, fingerprint data for a large number of reference songs may be stored in the on-device song database 404.

Figure 6A:
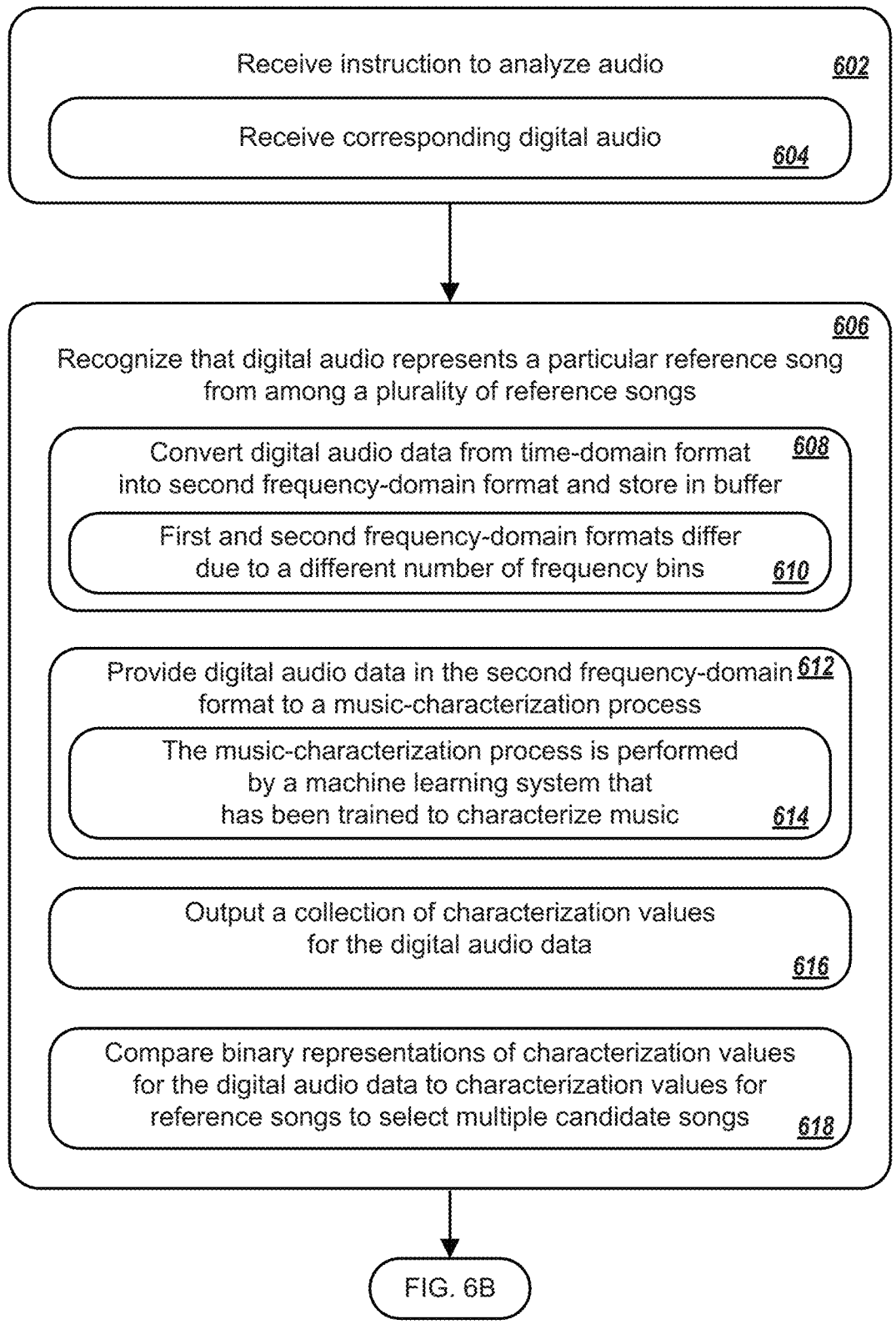

FIGS. 6A-B show a diagram of an example process for identifying a song that is currently playing in a current environment of the example computing device. In general, the process can be automatically initiated by a computing device in response to determining that music is contained in detected ambient audio (as described above with reference to FIGS. 3A-B). For example, the computing device 100 (shown in FIG. 1) can continuously monitor ambient sounds in an environment for possible music using the low-power processor 104 (also shown in FIG. 1), and only when music is detected, the computing device 100 can attempt to identify a particular song that is playing from among a plurality of reference songs, using the high-power processor 110 (also shown in FIG. 1).

At box 602, an instruction to analyze audio is received. For example, in response to the low-power processor 202 (shown in FIG. 2, similar to the low-power processor 104 shown in FIG. 1) determining that digital audio data represents music, the low-power processor 202 can provide the instruction to analyze audio 222 to the high-power processor 402 (shown in FIG. 4, similar to the high-power processor 110 shown in FIG. 1).

At box 604, receiving the instruction to analyze audio can include receiving the corresponding digital audio 224. For example, the corresponding digital audio 224 can include some or all of the contents of the digital audio buffer 206 (shown in FIG. 2). In the present example, the corresponding digital audio 224 includes the previous eight seconds of recorded and converted digital audio data, in time-domain format. This digital audio data may represent at least the same audio content on which the low-power processor 104 based its determination that music was playing.

At box 606, the computing device recognizes that the digital audio data represents a particular reference song from among a plurality of reference songs. For example, the high-power processor 402 can determine whether the corresponding digital audio 224 matches reference song characterization data for any of the songs represented in the on-device song database 404.

At box 608, recognizing that the digital audio data represents a particular reference song can include converting the digital audio data from a time-domain format into a second frequency-domain format during a second frequency-domain conversion process, and storing the converted digital audio data in a buffer. For example, the high-power processor 402 can perform a frequency transformation process 408 in which the corresponding digital audio 224 is converted from a time-domain format to the second frequency-domain format. The high-power processor 402, for example, can perform the frequency transformation process 408 on the corresponding digital audio 224 using sampling windows of a specified length (e.g., 92-millisecond sampling windows, 138-millisecond sampling windows, 184-millisecond sampling windows, or another suitable length), the windows occurring at a specified time interval (46-millisecond intervals, 69-millisecond intervals, 92-millisecond intervals). For each of the sampling windows, the frequency transformation process 408 outputs a corresponding data frame (e.g., data frame 410), which includes data values for a specified number of frequency bins (e.g., 256 bins, 512 bins, 1024 bins, or another suitable number of frequency bins), each frequency bin being associated with a frequency range. The value for each bin represents an intensity of audio across the frequency range during the sampling time period. In some examples, the frequency transformation process 408 can use a fast Fourier transform (FFT) algorithm to convert sampled portions of digital audio data from time-domain format into data frames in the second frequency-domain format. Each of the generated data frames can be stored by the high-power processor 402 in a sequential buffer of frequency samples 412, for example.

At box 610, the second frequency-domain format can differ from the first frequency-domain format due to processes for generating the second frequency-domain format and the first frequency-domain format analyzing a different number of frequency bins. The frequency ranges from which the bins are calculated may also be different between the second frequency-domain format and the first frequency-domain format (e.g., in the width of frequency analyzed for each individual bin, and/or the overall width of frequency analyzed). As shown in the present example, the frequency transformation process 208 performed by the low-power processor 202 (shown in FIG. 2) produces a series of relatively low-resolution data frames with respect to audio frequency (e.g., each frame having data for sixteen frequency range bins), as compared to the frequency transformation process 408 performed by the high-power processor 402 (shown in FIG. 4), which produces a series of relatively high-resolution data frames with respect to audio frequency (e.g., each frame having data for two hundred and fifty-six frequency range bins). Moreover, sampling rates may also vary between the two frequency transformation processes. As shown in the present example, the frequency transformation process 208 performed by the low-power processor 202 produces a series of data frames which have relatively short time windows (e.g., fifty milliseconds), as compared the frequency transformation process 408 performed by the high-power processor 402 which produces a series of data frames which have relatively long time windows (e.g., one hundred and eighty-four milliseconds).

At box 612, the digital audio data in the second frequency-domain format is provided to a music-characterization process that receives the audio data in the second frequency-domain format. For example, the high-power processor 402 can receive the buffer of frequency samples 412 and can perform a song characterizing process 416 on the buffer that processes the buffer in two second windows, the windows being sampled at one second intervals. In the present example, for each of the two second windows, the song characterizing process 406 outputs a set of ninety-six song characteristics (e.g. a feature vector or 96 values), thus resulting in seven sets of ninety-six song characteristics for the eight-second buffer of frequency samples 412. In some examples, the song characterizing process 406 outputs a set of one hundred and twenty eight dimensions. The windows may be spaced 0.5 seconds apart or 1 second apart, in various examples.

At box 614, the music-characterization process can be performed by a machine learning system that has been trained to characterize music. For example, to generate sets of song characteristics, the song characterizing process 416 can reference a machine-learning model that has been trained off-line (e.g., at the server system 150 at some time in the past), and provided to the high-power processor 402. The machine-learning model can be used to generate, for a window of frequency samples (e.g., a two second window) from a song, a set of song characteristics (e.g., a feature vector) that can be used at a time in the future, along with sets of song characteristics for preceding and/or following sections of music, to fingerprint or identify a song. In some examples, the machine-learning model can be a quantized convolutional neural network which runs on the high-power processor 402.

At box 616, a collection of characterization values for the digital audio data can be output. For example, the output of the song characterizing process 416 (e.g., seven sets of ninety-six song characteristics for the eight-second buffer of frequency samples 412) can be stored and/or maintained in device memory as current song characteristics 418, each song characteristic being represented by a float value (e.g., a real number value, such as 0.443).

At box 618, binary representations of the characterization values in the collection of characterization values for the digital audio data are compared to a plurality of characterization values for reference songs to select a subset of multiple candidate songs. The selected candidate songs may be those songs that are relevant to or otherwise match the binary representations of the characterization values for the ambient audio. For example, the high-power processor 402 can perform a candidate identification process 420 which receives some or all of the current song characteristics 418, receives some or all of the audio characteristics (e.g., feature vectors) for songs referenced in the on-device song database 404, and performs a comparison process to identify a plurality of possibly matching songs. In the present example, the candidate identification process 420 includes selecting a subset of characteristics (e.g., forty-eight of the ninety-six characteristics) from the current song characteristics 418, receiving the corresponding subset of values for each of the two second windows (e.g., seven sets of forty-eight values), and converting each of the values from a float value to a binary value. The candidate identification process 420 also receives binary values for each of the corresponding forty-eight audio characteristics for each of the songs represented in the on-device song database 404.

In some examples, the process in which the computing device compares each two-second set of current song characteristics to each two-second set of reference song characteristics is performed without the comparisons accounting for whether two-second windows of song characteristics match in sequential order. For example, the comparison could involve identifying the Hamming distances of each individual set of current song characteristics to other sets of reference song characteristics, without regard for the sequential nature of the sets of current song and reference song characteristics. As such, if one or more two-second windows of data for the current song match one or more two-second windows of data for a reference song, it is possible that the computing device may identify that the reference song as a candidate match, even though the computing device may not have determined that the entire eight-second buffer of data for the current song matches a corresponding eight-second buffer of data for a reference song.

In some examples, the reference songs are weighted so that songs that are determined to be more popular overall (or more relevant to criteria associated with a particular user, such as geographic location, listening trends, etc., as discussed above) are more likely to be identified as a possibly matching song.

Figure 7:
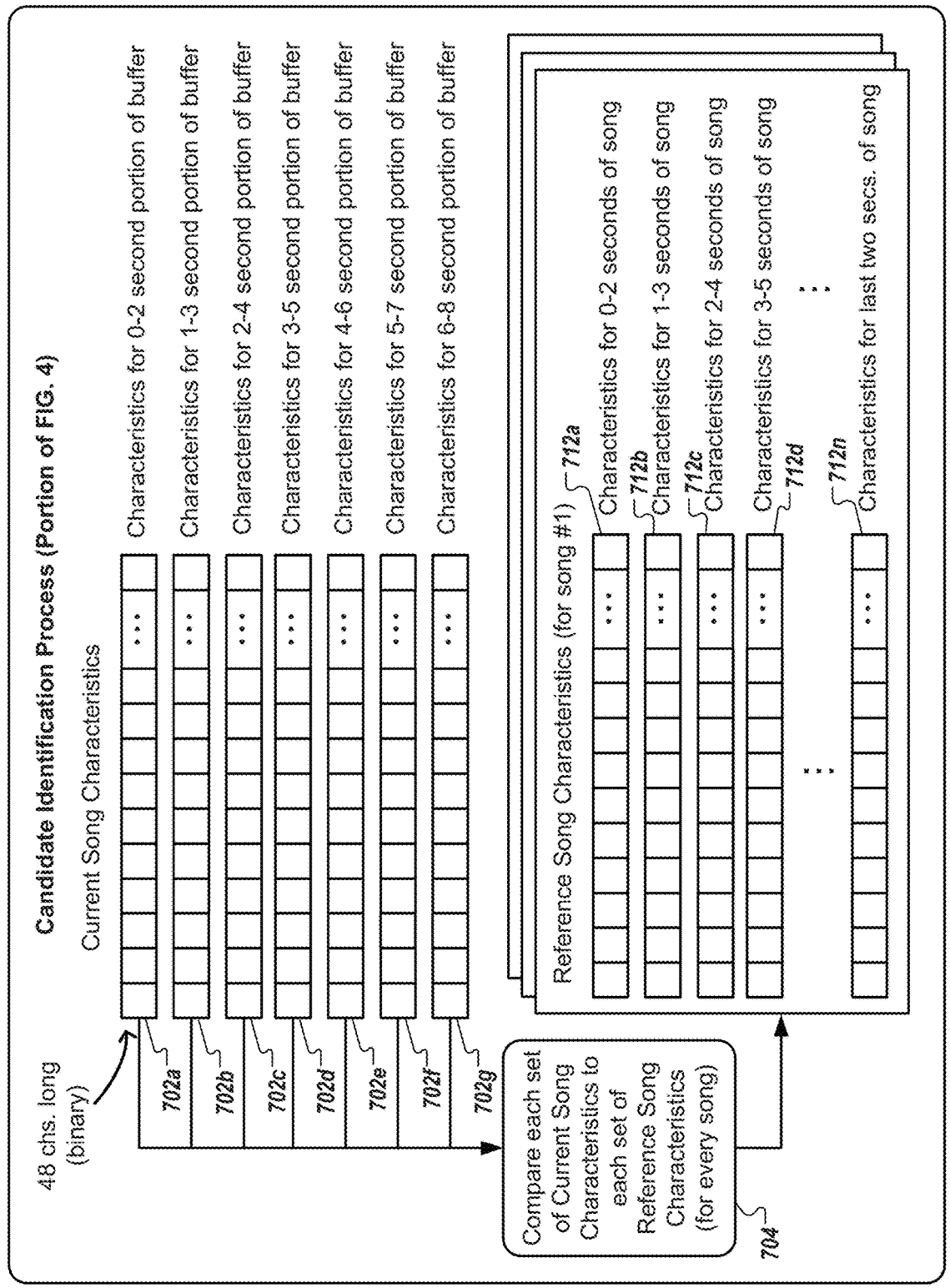
FIG. 7 is a conceptual diagram of an example song candidate identification process performed by the example computing device.

Referring now to FIG. 7, a conceptual diagram of an example candidate identification process performed by a computing device is shown (e.g., the candidate identification process 420). As shown in FIG. 7, the current song characteristics 418 include a set of song characteristics for each sampled window of the buffer of frequency samples 412 (shown in FIG. 4), each sampled window overlapping in part with the adjacent sampled windows. In the present example, the current song characteristics include a set of characteristics 702a for the 0-2 second portion of the buffer, a set of characteristics 702b for the 1-3 second portion of the buffer, a set of characteristics 702c for the 2-4 second portion of the buffer, a set of characteristics 702d for the 3-5 second portion of the buffer, a set of characteristics 702e for the 4-6 second portion of the buffer, a set of characteristics 702f for the 5-7 second portion of the buffer, and a set of characteristics 702g for the 6-8 second portion of the buffer. A comparison 704 is performed by the high-power processor 402 (shown in FIG. 4), including comparing each set of current song characteristics to each set of reference song characteristics, for every song. For example, the sequential sets of current song characteristics 702a-g are compared to sequential sets of reference song characteristics having a same number of sets (e.g., seven), at all possible reference offsets, for every song. In the present example, the seven sequential sets of current song characteristics 702a-g are compared to seven sequential sets of reference song characteristics for reference song #1, starting at reference offset set 712a (e.g., song characteristics for 0-2 seconds), then starting at reference offset set 712b (e.g., song characteristics for 1-3 seconds), then starting at reference offset 712c (e.g., song characteristics for 2-4 seconds), then starting at reference offset 712d (e.g., song characteristics for 3-5 seconds), and so forth, until the set of current song characteristics 702g for the 6-8 second portion of the buffer are compared to the set of reference song characteristics 712n for the last two seconds of the reference song.

In some examples, comparing each set of current song characteristics to each set of reference song characteristics can include computing Hamming distances of a sequential set of current song characteristics against sequences of a same number of sets of reference song characteristics at all possible reference offsets. A score can be computed for a particular reference song at a particular offset position, for example, by summing the Hamming distances. If a particular reference song at a particular offset position has a score that satisfies a threshold value (e.g., the score is lower than the threshold value), the song can be identified as a possible matching song, and can be added to a list of song candidates. Information about the reference song and its relevant offset position can be maintained (e.g., in memory) to facilitate further processing.

In some examples, the candidate identification process 420 involves execution of an analysis tree in which the current song characteristics (in binary format) are provided as input to the tree and the candidate songs are located in branches in the tree according to the values of characteristics of the reference songs. As such, the high-power processor 110 may not compare the current song characteristics to each and every set of reference song characteristics for all reference songs in the on-device song database 116. Rather, the high-power processor 110 may simply navigate the tree to identify zero or more candidate songs that the current song characteristics.

At box 620, the collection of characterization values for the digital audio data are compared to the plurality of characterization values for each of at least the candidate subset of the plurality of reference songs. Referring again to FIG. 4, for example, the high-power processor 402 can perform a song identification process 422 to identify a single matching song (or no matching song) from the list of song candidates (e.g., one hundred songs). In some examples, the operations of box 620 are performed on the subset of candidate songs identified in box 618. In some examples, the operations of box 620 may be performed without having previously identified a subset of candidate songs.

At box 622, comparing the characterization values for the digital audio data to the plurality of characterization values for each of at least the subset of the plurality of reference songs includes a comparison in which (a) the characterization values for the digital audio data are real numbers, and (b) the characterization values for each of at least the subset of the plurality of songs are limited to binary zeros and binary ones. For example, the song identification process 422 can receive some or all of the current song characteristics 418, and can receive some or all of the audio characteristics (e.g., feature vectors) for songs referenced in the on-device song database 404 that are included in the list of song candidates. Each of the characterization values for the current song characteristics 418, for example, can be float values, whereas each of the characterization values for the songs referenced in the on-device song database 404 can be binary values.

In some examples, comparing characterization values for the digital audio data to characterization values for a reference song can include a comparison of fewer than all of the song characteristics. For example, to filter the song candidates in the list of song candidates, the song identification process 422 can include re-computing the score for each candidate reference song, at its previously identified offset position. Re-computing the score, for example, can include computing an asymmetric binary distance (e.g., a cosine distance between a binary value for a current song characteristic and a float value for a corresponding reference song characteristic, where false=−1 and true=1). In the present example, the filtering process can use forty-eight of the ninety-six characteristics. If a particular reference song at a particular offset position has a score that does not satisfy a threshold value (e.g., the score is greater than or equal to the threshold value), the song can be removed from the list of song candidates.

In some examples, comparing characterization values for the digital audio data to characterization values for a reference song can include a comparison of all of the song characteristics. For example, to identify a single matching song from the list of song candidates (or to determine that no song matches), the song identification process 422 can include re-computing the score for each candidate reference song, at its previously identified offset position. Re-computing the score, for example, can include computing an asymmetric binary distance (e.g., a cosine distance between a binary value for a current song characteristic and a float value for a corresponding reference song characteristic, where false=−1 and true=1) over all ninety-six characteristics, and can include various adaptive scoring techniques. As another example, the song identification process 422 can re-compute the score by applying a similarity map 424 for each of the candidate reference songs, and computing a score along a diagonal. As another example, the song identification process 422 can re-compute the score by using a comparison tree.

At box 624, comparing the characterization values for the digital audio data to the plurality of characterization values for each of at least the subset of the plurality of reference songs is performed by accessing the plurality of characterization values for each of at least the subset of the plurality of songs on the computing device without sending a request for relevant data to a remote computing device. For example, the on-device song database 404 can include compact fingerprints for tens of thousands of songs, thus facilitating song identification on a mobile device itself, without requiring audio data to be sent from the mobile device to a server for identification. By performing song identification on the mobile device itself, song identification can be performed quickly, and can be performed in situations in which a network connection is unavailable. Further, by performing song identification without requiring audio data to be sent from the mobile device to a server, user privacy can be maintained.

In some examples, calculating the score for a candidate song can account for an extent to which the entire buffer of data for the current song matches an entire, corresponding buffer of data the candidate reference song. In examples in which the buffer for the current song is eight seconds and comprises seven two-second windows of data, the extent to which those seven windows of data sequentially match seven windows of data for a candidate song may affect the computed score for the candidate reference song. In other examples, the entire buffers may not have to match each other, but the number of sequential matches may affect the computed score for the candidate song.

In some examples, the reference songs are weighted so that songs that are determined to be more popular overall (or more relevant to criteria associated with a particular user, such as geographic location, listening trends, etc.) are more likely to be identified as a matching song.

At box 626, a determination is made that the plurality of characterization values for the particular reference song are most relevant to the collection of characterization values for the digital audio data. For example, the song identification process 422 can rank each of the remaining song candidates according to its computed score, and can identify a particular candidate song as having song characteristics that match the current song characteristics 418 when the particular candidate song has a highest ranking among all remaining song candidates, and when the particular candidate song's score satisfies a threshold value. If none of the candidate songs have a score that satisfies the threshold value, for example, the song identification process does not identify any song as having song characteristics that match the current song characteristics 418. By performing song identification in two or more stages in which a large corpus of songs are filtered to a relatively small subset of candidate songs using a lightweight process, then a matching song is identified in the small subset of candidate songs using a more computationally intensive process, processing resources can be conserved while quickly and accurately identifying the matching song.

At box 628, in response to having determined that the plurality of characterization values for the particular reference song are most relevant to the collection of characterization values for the digital audio data, the computing device outputs an indication that the particular reference song is playing. For example, the song identification process 422 can output an indication 430 of an identified song.

Figure 8:
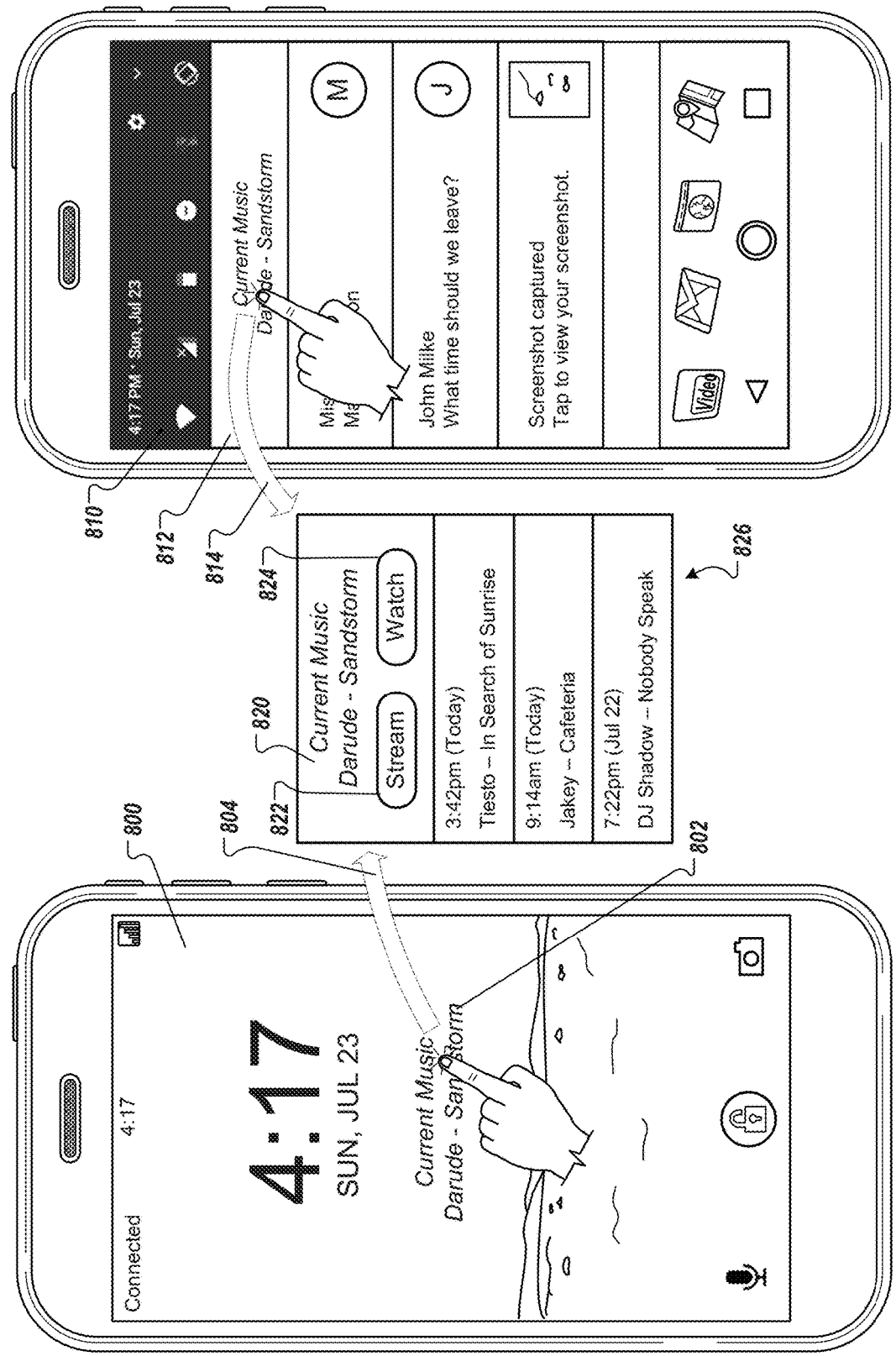
FIG. 8 shows example user interfaces presented by a computing device indicating that an identified song is playing in an ambient environment.

At box 630, outputting the indication that the particular reference song is playing includes presenting a name of the particular reference song on a lock screen of the computing device, without user input having prompted the computing device to perform a song-identification process, other than enabling a continuous song-identification process at least several hours earlier (e.g., at least four hours earlier, multiple days earlier, or at least a month earlier). Referring to FIG. 8, for example, an example user interface 800 is shown that can be provided on a lock screen of the computing device 100 (shown in FIG. 1). For example, the user interface 800 includes a visual indication 802 of a currently identified song, which can include text information related to the song, such as a song title, artist name, album name, and other relevant information. In some examples, outputting the indication that the particular reference song is playing can include playing audio that identifies the particular reference song. For example, the audio can announce a song title, artist name, album name, and other relevant information.

At box 632, outputting the indication that the particular reference song is playing includes presenting a name of the particular reference song in a notification panel of an unlocked screen of the computing device, without user input having prompted the computing device to perform a song-identification process, other than enabling a continuous song-identification process at least several hours earlier (e.g., at least four hours earlier, multiple days earlier, or at least a month earlier). The computing device 100 can also display historical song information, for example, previous one or more songs that were played recently, and/or songs that were played at the same time the day before. Referring to FIG. 8 again, for example, an example user interface 810 is shown that presents a name of the particular reference song in a notification panel 812 of an unlocked screen of the computing device 100 (shown in FIG. 1). For example, the notification panel 812 can include a notification that includes text information related to a currently identified song, such as a song title, artist name, album name, and other relevant information. The computing device 100 may also present the notification in a pop-up dialog box (e.g., rather than a pull down menu), or may present the notification as changed text in a background display of a device home screen.

In some examples, user interaction with a presented song identification control can cause a computing device to perform one or more actions with respect to an identified song. For example, in response to a user interaction 804 (e.g., a touch input) with the visual indication 802 of the user interface 800 or in response to a user interaction 814 (e.g., a touch input) with the notification panel 812 of the user interface 810, the computing device 100 (shown in FIG. 1) can present an interface 820 that presents further information (e.g., year of release, lyrics, image of album cover, link to associated web content) and/or available options with respect to a currently identified song and previously identified songs. In the present example, the interface 820 includes a streaming control 822, a watch control 824, and a list of previously identified songs 826. In response to a user selection of the streaming control 822, for example, streaming of the currently identified song to the computing device 100 can be initiated. In response to a user selection of the watch control 824, for example, the computing device 100 may play a video of the currently identified song. In response to a selection of song on the list of previously identified songs 826, for example, the computing device 100 may present options and/or additional information for the selected song.

In some examples, main portions or all of the song-identification process is performed server side and not client side. In such examples, the server-side computing system may not send song characteristic data to a client device, and instead may receive from a client device audio data or song characteristic data generated from audio recorded at the client device, and the server-side computing system may perform the song identification. For example, the server-side computing system may perform the operations of boxes 602-626 and, if a match is found, the server-side computing system may send information that identifies the matching song for presentation by the client device that recorded the audio (e.g., as discussed at boxes 628-632). In such examples, the server-side computing system may or may not perform operations to determine whether music is playing (e.g., as described by boxes 308-326). Such analysis can avoid processing audio that is determined to not include a song. Still, the server-side computing system may analyze audio due to a user having specifically asked that a song be identified, so it may be reasonable to skip the "is music playing" operations and simply jump to the more-involved "which song is playing" operations. In short, the music determination process is optional, and both the music determination and the song identification processes can be performed client side, server-side, or split with one being performed at the client and the other being performed at the server.

Figure 9:
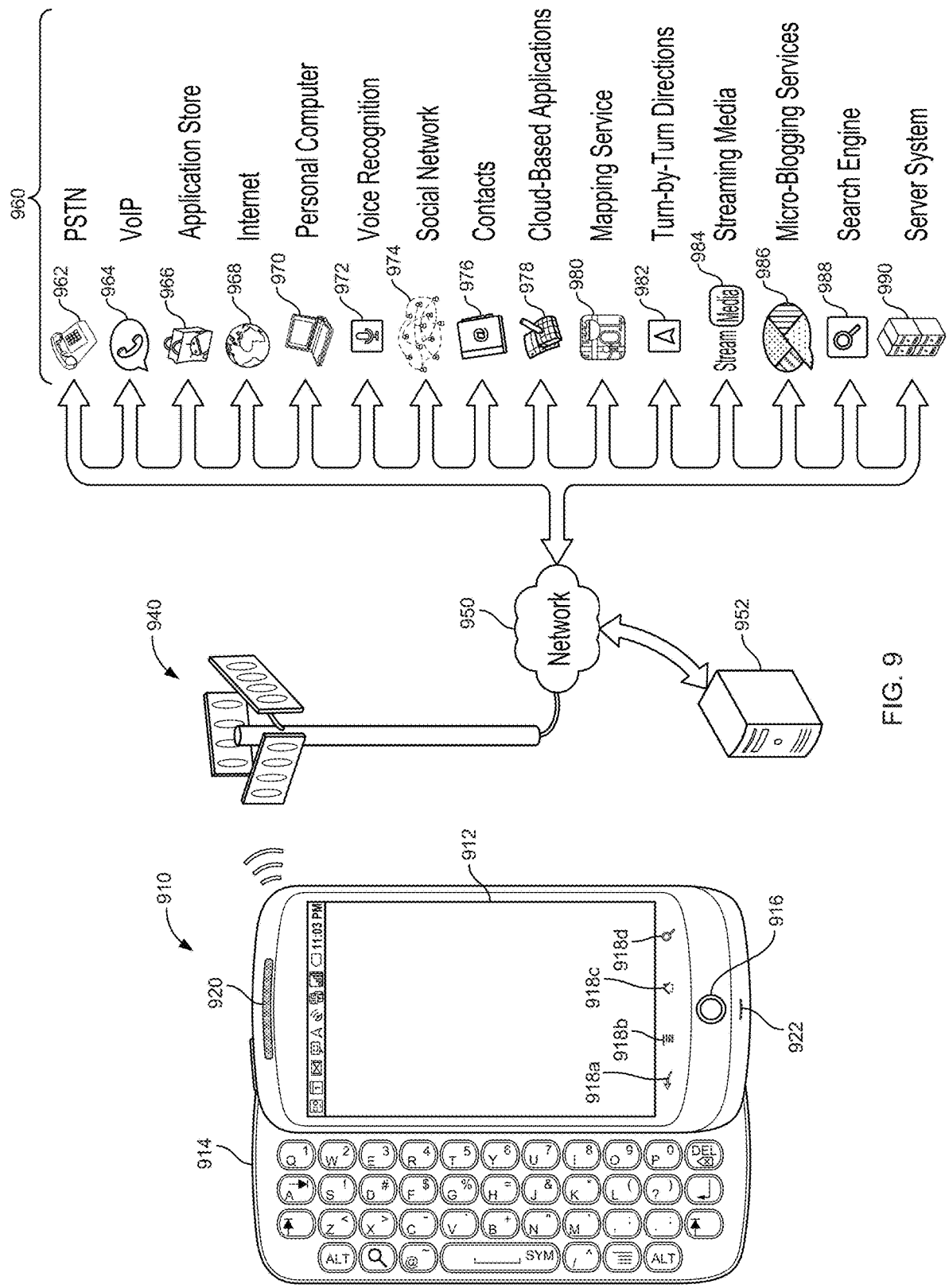
FIG. 9 is a conceptual diagram of an example system that implements the systems and methods described in this document.

Referring now to FIG. 9, a conceptual diagram of an example system that implements the systems and methods described in this document is illustrated. In the system, mobile computing device 910 can wirelessly communicate with base station 940, which can provide the mobile computing device wireless access to numerous hosted services 960 through a network 950.

In this illustration, the mobile computing device 910 is depicted as a handheld mobile telephone (e.g., a smartphone, or an application telephone) that includes a touchscreen display device 912 for presenting content to a user of the mobile computing device 910 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 914, physical buttons, trackballs, accelerometers, gyroscopes, and magnetometers).

Example visual output mechanism in the form of display device 912 may take the form of a display with resistive or capacitive touch capabilities. The display device may be for displaying video, graphics, images, and text, and for coordinating user touch input locations with the location of displayed information so that the device 910 can associate user contact at a location of a displayed item with the item. The mobile computing device 910 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 914, which may be a full qwerty keyboard or a traditional keypad that includes keys for the digits '0-9', '*', and '#.' The keyboard 914 receives input when a user physically contacts or depresses a keyboard key. User manipulation of a trackball 916 or interaction with a track pad enables the user to supply directional and rate of movement information to the mobile computing device 910 (e.g., to manipulate a position of a cursor on the display device 912).

The mobile computing device 910 may be able to determine a position of physical contact with the touchscreen display device 912 (e.g., a position of contact by a finger or a stylus). Using the touchscreen 912, various "virtual" input mechanisms may be produced, where a user interacts with a graphical user interface element depicted on the touchscreen 912 by contacting the graphical user interface element. An example of a "virtual" input mechanism is a "software keyboard," where a keyboard is displayed on the touchscreen and a user selects keys by pressing a region of the touchscreen 912 that corresponds to each key.

The mobile computing device 910 may include mechanical or touch sensitive buttons 918a-d. Additionally, the mobile computing device may include buttons for adjusting volume output by the one or more speakers 920, and a button for turning the mobile computing device on or off. A microphone 922 allows the mobile computing device 910 to convert audible sounds into an electrical signal that may be digitally encoded and stored in computer-readable memory, or transmitted to another computing device. The mobile computing device 910 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 910 may present a graphical user interface with the touchscreen 912. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 904. User-selection of the button may invoke the pre-defined action.

In some examples, the operating system provides a "desktop" graphical user interface that is displayed after turning on the mobile computing device 910, after activating the mobile computing device 910 from a sleep state, after "unlocking" the mobile computing device 910, or after receiving user-selection of the "home" button 918c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 910 operations. For example, a single-action user input (e.g., a single tap of the touchscreen, swipe across the touchscreen, contact with a button, or combination of these occurring at a same time) may invoke an operation that changes a display of the user interface.

Without the user-input, the user interface may not have changed at a particular time. For example, a multi-touch user input with the touchscreen 912 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 910 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 910 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 910. The mobile device 910 may include a digital camera sensor, and corresponding image and video capture and editing software. An internet browser may enable the user to view content from a web page by typing in an addresses corresponding to the web page or selecting a link to the web page.

The mobile computing device 910 may include an antenna to wirelessly communicate information with the base station 940. The base station 940 may be one of many base stations in a collection of base stations (e.g., a mobile telephone cellular network) that enables the mobile computing device 910 to maintain communication with a network 950 as the mobile computing device is geographically moved. The computing device 910 may alternatively or additionally communicate with the network 950 through a Wi-Fi router or a wired connection (e.g., ETHERNET, USB, or FIREWIRE). The computing device 910 may also wirelessly communicate with other computing devices using BLUETOOTH protocols, or may employ an ad-hoc wireless network.

A service provider that operates the network of base stations may connect the mobile computing device 910 to the network 950 to enable communication between the mobile computing device 910 and other computing systems that provide services 960. Although the services 960 may be provided over different networks (e.g., the service provider's internal network, the Public Switched Telephone Network, and the Internet), network 950 is illustrated as a single network. The service provider may operate a server system 952 that routes information packets and voice data between the mobile computing device 910 and computing systems associated with the services 960.

The network 950 may connect the mobile computing device 910 to the Public Switched Telephone Network (PSTN) 962 in order to establish voice or fax communication between the mobile computing device 910 and another computing device. For example, the service provider server system 952 may receive an indication from the PSTN 962 of an incoming call for the mobile computing device 910. Conversely, the mobile computing device 910 may send a communication to the service provider server system 952 initiating a telephone call using a telephone number that is associated with a device accessible through the PSTN 962.

The network 950 may connect the mobile computing device 910 with a Voice over Internet Protocol (VoIP) service 964 that routes voice communications over an IP network, as opposed to the PSTN. For example, a user of the mobile computing device 910 may invoke a VoIP application and initiate a call using the program. The service provider server system 952 may forward voice data from the call to a VoIP service, which may route the call over the internet to a corresponding computing device, potentially using the PSTN for a final leg of the connection.

An application store 966 may provide a user of the mobile computing device 910 the ability to browse a list of remotely stored application programs that the user may download over the network 950 and install on the mobile computing device 910. The application store 966 may serve as a repository of applications developed by third-party application developers. An application program that is installed on the mobile computing device 910 may be able to communicate over the network 950 with server systems that are designated for the application program. For example, a VoIP application program may be downloaded from the Application Store 966, enabling the user to communicate with the VoIP service 964.

The mobile computing device 910 may access content on the internet 968 through network 950. For example, a user of the mobile computing device 910 may invoke a web browser application that requests data from remote computing devices that are accessible at designated universal resource locations. In various examples, some of the services 960 are accessible over the internet.

The mobile computing device may communicate with a personal computer 970. For example, the personal computer 970 may be the home computer for a user of the mobile computing device 910. Thus, the user may be able to stream media from his personal computer 970. The user may also view the file structure of his personal computer 970, and transmit selected documents between the computerized devices.

A voice recognition service 972 may receive voice communication data recorded with the mobile computing device's microphone 922, and translate the voice communication into corresponding textual data. In some examples, the translated text is provided to a search engine as a web query, and responsive search engine search results are transmitted to the mobile computing device 910.

The mobile computing device 910 may communicate with a social network 974. The social network may include numerous members, some of which have agreed to be related as acquaintances. Application programs on the mobile computing device 910 may access the social network 974 to retrieve information based on the acquaintances of the user of the mobile computing device. For example, an "address book" application program may retrieve telephone numbers for the user's acquaintances. In various examples, content may be delivered to the mobile computing device 910 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 910 may access a personal set of contacts 976 through network 950. Each contact may identify an individual and include information about that individual (e.g., a phone number, an email address, and a birthday). Because the set of contacts is hosted remotely to the mobile computing device 910, the user may access and maintain the contacts 976 across several devices as a common set of contacts.

The mobile computing device 910 may access cloud-based application programs 978. Cloud-computing provides application programs (e.g., a word processor or an email program) that are hosted remotely from the mobile computing device 910, and may be accessed by the device 910 using a web browser or a dedicated program. Example cloud-based application programs include GOOGLE DOCS word processor and spreadsheet service, GOOGLE GMAIL webmail service, and PICASA picture manager.

Mapping service 980 can provide the mobile computing device 910 with street maps, route planning information, and satellite images. An example mapping service is GOOGLE MAPS. The mapping service 980 may also receive queries and return location-specific results. For example, the mobile computing device 910 may send an estimated location of the mobile computing device and a user-entered query for "pizza places" to the mapping service 980. The mapping service 980 may return a street map with "markers" superimposed on the map that identify geographical locations of nearby "pizza places."

Turn-by-turn service 982 may provide the mobile computing device 910 with turn-by-turn directions to a user-supplied destination. For example, the turn-by-turn service 982 may stream to device 910 a street-level view of an estimated location of the device, along with data for providing audio commands and superimposing arrows that direct a user of the device 910 to the destination.

Various forms of streaming media 984 may be requested by the mobile computing device 910. For example, computing device 910 may request a stream for a pre-recorded video file, a live television program, or a live radio program. Example services that provide streaming media include YOUTUBE and PANDORA.

A micro-blogging service 986 may receive from the mobile computing device 910 a user-input post that does not identify recipients of the post. The micro-blogging service 986 may disseminate the post to other members of the micro-blogging service 986 that agreed to subscribe to the user.

A search engine 988 may receive user-entered textual or verbal queries from the mobile computing device 910, determine a set of internet-accessible documents that are responsive to the query, and provide to the device 910 information to display a list of search results for the responsive documents. In examples where a verbal query is received, the voice recognition service 972 may translate the received audio into a textual query that is sent to the search engine.

These and other services may be implemented in a server system 990. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 10:
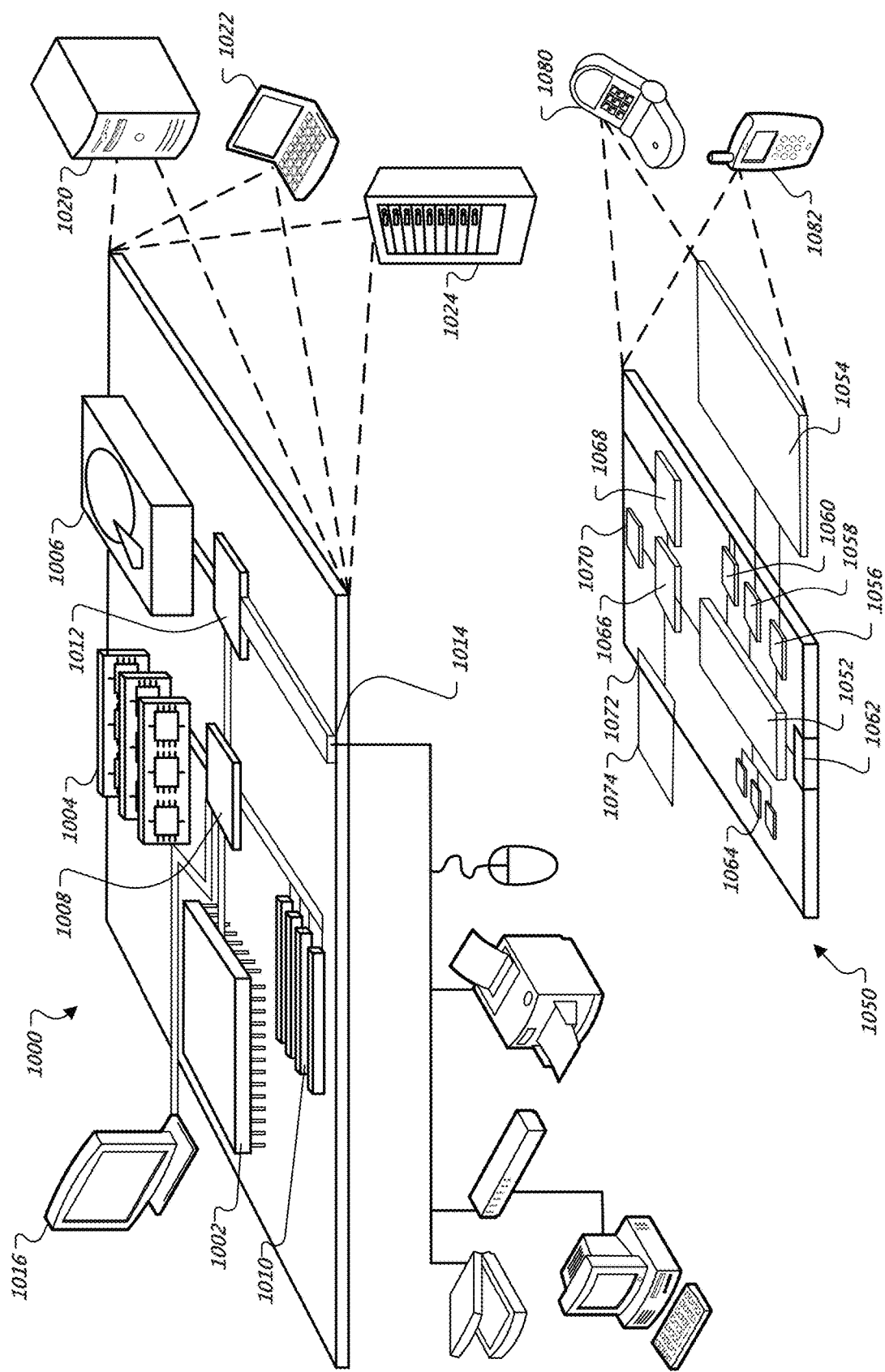
FIG. 10 is a block diagram of example computing devices that implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other examples, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provided, for example, for wired communication in some examples, or for wireless communication in other examples, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few examples have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other examples are within the scope of the following claims.

What is claimed is:

1. A computer-implemented method, comprising:
    storing, by a computing device, reference song characterization data that identify a plurality of audio characteristics for each reference song in a plurality of reference songs;
    receiving, by the computing device, digital audio data that represents audio recorded by a microphone;
    determining, by a first processor of the computing device and using a music determination process, whether the digital audio data represents music, wherein the determining includes converting the digital audio data from a time-domain format into a first frequency-domain format, the first frequency-domain format having a first number of frequency range bins;
    recognizing, by a second processor of the computing device after determining that the digital audio data represents music, that the digital audio data represents a particular reference song from among the plurality of reference songs, wherein the recognizing includes converting the digital audio data from the time-domain format into a second frequency-domain format having a second number of frequency range bins that is greater than the first number of frequency range bins, wherein the first processor and the second processor are distinct hardware processors included in the computing device, the first processor operating at a lower voltage than the second processor; and
    outputting, by the computing device in response to recognizing that the digital audio data represents a particular reference song from among the plurality of reference songs, an indication of the particular reference song.

2. The computer-implemented method of claim 1, wherein the plurality of reference songs includes at least ten thousand reference songs, such that the reference song characterization data identify audio characteristics for the at least ten thousand reference songs.

3. The computer-implemented method of claim 1, wherein the reference song characterization data includes reference song characterization values, wherein the reference song characterization values for the reference songs in the plurality of reference songs are limited to a binary one or a binary zero, such that each reference song characterization value is limited to a binary one or a binary zero.

4. The computer-implemented method of claim 1, wherein determining whether the digital audio data represents music includes:
   using the digital audio data in the first frequency-domain format in the music determination process, and
   outputting an indication that the digital audio data represents music.

5. The computer-implemented method of claim 4, wherein the music determination process includes executing a machine learning system that has been trained to determine whether audio represents music.

6. The computer-implemented method of claim 4, wherein the frequency-domain conversion process is a first frequency-domain conversion process, and recognizing that the digital audio data represents the particular reference song includes:
   (i) converting the digital audio data from the time-domain format into the second frequency-domain format during a second frequency-domain conversion process,
   (ii) using the digital audio data in the second frequency-domain format in a music-characterization process that receives the digital audio data in the second frequency-domain format and outputs a collection of characterization values for the digital audio data, and
   (iii) comparing the collection of characterization values for the digital audio data to a plurality of characterization values for each of at least a subset of the plurality of reference songs, to determine that the plurality of characterization values for the particular reference song are most relevant to the collection of characterization values for the digital audio data.

7. The computer-implemented method of claim 6, wherein the music-characterization process is performed by a machine learning system that has been trained to characterize music.

8. The computer-implemented method of claim 6, wherein comparing the collection of characterization values for the digital audio data to the plurality of characterization values for each of at least a subset of the plurality of reference songs is performed by accessing the plurality of characterization values that are stored by the computing device for each of the at least subset of the plurality of songs without sending a request for song characterization data to another computing device.

9. The computer-implemented method of claim 6, wherein the computing device compares the collection of characterization values for the digital audio data to the plurality of characterization values for each of only the subset of the plurality of reference songs, and the method further comprises:
   comparing the characterization values in the collection of characterization values for the digital audio data to the plurality of characterization values for each of the plurality of candidate songs to select the subset of the plurality of reference songs.

10. The computer-implemented method of claim 6, further comprising converting the characterization values in the collection of characterization values for the digital audio data from values that are not all limited to binary zeros and ones to values that are limited to binary zeros and ones; wherein comparing the characterization values in the collection of characterization values for the digital audio to the plurality of characterization values for each of the plurality of candidate songs includes a comparison in which:
   (a) the characterization values for the digital audio data are limited to binary zeros and binary ones, and
   (b) the characterization values for each of the plurality of songs are limited to binary zeros and binary ones.

11. The computer-implemented method of claim 6, wherein comparing the collection of characterization values for the digital audio data to the plurality of characterization values for each of at least a subset of the plurality of reference songs includes a comparison in which:
   (a) the characterization values for the digital audio data include real numbers that represent values other than binary zeros and binary ones, and
   (b) the characterization values for each of the at least subset of the plurality of songs are limited to binary zeros and binary ones.

12. The computer-implemented method of claim 1, wherein the computing device determines whether the digital audio data represents music without accessing the reference song characterization data that identify the plurality of audio characteristics for each reference song in the plurality of reference songs.

13. The computer-implemented method of claim 1, wherein determining whether the digital audio data represents music includes the computing device determining, multiple times without receipt of user input that initiates the music determination process, that the digital audio data does not represent music, before determining that the digital audio data represents music.

14. The computer-implemented method of claim 1, wherein the second processor operates from a clock signal that is at least an order of magnitude faster than a clock signal from which the first processor operates.

15. The computer-implemented method of claim 1, wherein outputting the indication that the particular reference song is playing includes presenting a name of the particular reference song on a lock screen of the computing device, in an always on screen of the computing device, or in a notification presented over an unlocked screen of the computing device, without user input having prompted the computing device to perform a song-identification process, other than enabling a continuous song-identification process.

16. The computer-implemented method of claim 1, wherein the computing device includes the microphone.

17. A computerized system, comprising:
   one or more processors; and
   one or more computer-readable devices including instructions that, when executed by the one or more processors, cause performance of operations comprising:
      storing, by a computing device, reference song characterization data that identify a plurality of audio characteristics for each reference song in a plurality of reference songs;
      receiving, by the computing device, digital audio data that represents audio recorded by a microphone;
      determining, by a first processor of the computing device and using a music determination process, whether the digital audio data represents music, wherein the determining includes converting the digital audio from a time-domain format into a first frequency-domain format, the first frequency-domain format having a first number of frequency range bins;
      recognizing, by a second processor of the computing device after determining that the digital audio data represents music, that the digital audio data represents a particular reference song from among the plurality of reference songs, wherein the recognizing includes converting the digital audio data from the time-domain format into a second frequency-domain format having a second number of frequency range bins that is greater than the first number of frequency range bins, wherein the first processor and the second processor are distinct hardware processors included in the computing device, the first processor operating at a lower voltage than the second processor; and outputting, by the computing device in response to recognizing that the digital audio data represents a particular reference song from among the plurality of reference songs, an indication of the particular reference song.

18. A computing system, comprising:
a microphone configured to record an audio signal;
an analog-to-digital converter configured to generate digital audio data from a recorded audio signal;
one or more computer-readable memory devices that store:
  (i) reference song characterization data that identify a plurality of audio characteristics for each reference song in a plurality of reference songs, and
  (ii) instructions that are executable by processors and configure operation of the processors;
a first processor configured to output an indication that the digital audio data represents music upon determining that the digital audio data represents music, wherein the determining includes converting the digital audio data from a time-domain format into a first frequency-domain format, the first frequency-domain format having a first number of frequency range bins;
a second processor configured to receive from the first processor the indication that the digital audio data represents music, and recognize that the digital audio data represents a particular reference song from among the plurality of reference songs, wherein the recognizing includes converting the digital audio data from the time-domain format into a second frequency-domain format having a second number of frequency range bins that is greater than the first number of frequency range bins, wherein the first processor and the second processor are distinct hardware processors included in the computing system, the first processor operating at a lower voltage than the second processor; and
a display device configured to present an identification of the particular reference song responsive to the second processor recognizing that the digital audio data represents the particular reference song from among the plurality of reference songs.

19. The computing system of claim 18, wherein the computing system comprises a mobile computing device that includes the microphone, the analog-to-digital converter, the one or more computer-readable memory devices, the first processor, and the second processor.

20. The computing system of claim 19, wherein the first processor is configured to output the indication that the digital audio data represents music and the second processor is configured to recognize that the digital audio data represents the particular reference song without the computing device sending the digital audio data to a computing system other than the computing device.

21. The computing system of claim 19, wherein the first processor is configured to output the indication that the digital audio data represents music and the second processor is configured to recognize that the digital audio data represents the particular reference song while the computing device is without a network connection to any external device.

22. The computing system of claim 19, wherein determining that the digital audio data represents music includes the first processor determining, multiple times without receipt of user input that initiates a music determination process, that the digital audio data does not represent music, before the first processor determines that the digital audio data represents music.

23. The computing system of claim 18, wherein the second processor operates from a clock signal that is at least an order of magnitude faster than a clock signal from which the first processor operates.

24. The computing system of claim 18, wherein the reference song characterization data includes reference song characterization values, wherein the reference song characterization values for the reference songs in the plurality of reference songs, stored by the one or more computer-readable memory devices, are limited to a binary one or a binary zero, such that each reference song characterization value is limited to a binary one or a binary zero.

25. The computing system of claim 18, wherein the plurality of reference songs includes at least ten thousand reference songs, such that the reference song characterization data that is stored by the one or more computer-readable memory devices identify audio characteristics for the at least ten thousand reference songs.

26. The computing system of claim 18, wherein the first processor is configured to determine that the digital audio data represents music by:
using the digital audio data in the first frequency-domain format in a music-determination process that receives the digital audio data in the first frequency-domain format and outputs the indication that the digital audio data represents music.

27. The computing system of claim 26, wherein the music-determination process includes executing a machine learning system that has been trained to determine whether audio represents music.

28. The computing system of claim 26, wherein the music-determination process includes executing a convolutional neural network on a low-power processor.

29. The computing system of claim 18, wherein the frequency-domain conversion process is a first frequency-domain conversion process, and the second processor is configured to recognize that the digital audio data represents a particular reference song from among the plurality of reference songs by:
  (i) converting the digital audio data from the time-domain format into the second frequency-domain format during a second frequency-domain conversion process,
  (ii) using the digital audio data in the second frequency-domain format in a music-characterization process that receives the digital audio data in the second frequency-domain format and outputs a collection of characterization values for the digital audio data, and
  (iii) comparing the collection of characterization values for the digital audio data to a plurality of characterization values for each of a subset of the plurality of reference songs, to determine that the plurality of characterization values for the particular reference song are most relevant to the collection of characterization values for the digital audio data.

30. The computing system of claim 29, wherein the music-characterization process is performed by a machine learning system that has been trained to characterize music.

31. The computing system of claim 29, wherein comparing the collection of characterization values for the digital audio data to the plurality of characterization values for each of the subset of the plurality of reference songs is performed by accessing the plurality of characterization values that are stored by the computing system for each of the subset of the plurality of songs without sending a request for song characterization data to another computing system.

32. The computing system of claim 29, further comprising:
comparing the characterization values in the collection of characterization values for the digital audio data to the plurality of characterization values for each of the plurality of candidate songs to select the subset of the plurality of reference songs.

33. The computing system of claim 29, further comprising:
converting the characterization values in the collection of characterization values for the digital audio data from values that are not all limited to binary zeros and ones to values that are limited to binary zeros and ones; and
comparing the characterization values in the collection of characterization values for the digital audio data to the plurality of characterization values for each of the plurality of reference songs includes a comparison in which:
 (a) the characterization values for the digital audio data are limited to binary zeros and binary ones, and
 (b) the characterization values for each of the plurality of songs are limited to binary zeros and binary ones.

34. The computing system of claim 29, wherein comparing the collection of characterization values for the digital audio data to the plurality of characterization values for each of the subset of the plurality of reference songs includes a comparison in which:
 (a) the characterization values for the digital audio data include real numbers that represent values other than binary zeros and binary ones, and
 (b) the characterization values for each of the at least subset of the plurality of songs are limited to binary zeros and binary ones.

* * * * *